US010872601B1

(12) United States Patent
Acharya et al.

(10) Patent No.: US 10,872,601 B1
(45) Date of Patent: Dec. 22, 2020

(54) NATURAL LANGUAGE PROCESSING

(71) Applicant: Amazon Technologies, Inc., Seattle, WA (US)

(72) Inventors: Anish Acharya, Santa Clara, CA (US); Angeliki Metallinou, Mountain View, CA (US); Rahul Goel, Sunnyvale, CA (US); Inderjit Dhillon, Berkeley, CA (US)

(73) Assignee: Amazon Technologies, Inc., Seattle, WA (US)

(*) Notice: Subject to any disclaimer, the term of this patent is extended or adjusted under 35 U.S.C. 154(b) by 147 days.

(21) Appl. No.: 16/144,197

(22) Filed: Sep. 27, 2018

(51) Int. Cl.
*G10L 15/00* (2013.01)
*G10L 15/18* (2013.01)
*G10L 15/22* (2006.01)
*G10L 15/30* (2013.01)
*G10L 15/16* (2006.01)

(52) U.S. Cl.
CPC .......... *G10L 15/1815* (2013.01); *G10L 15/22* (2013.01); *G10L 15/30* (2013.01); *G10L 15/16* (2013.01); *G10L 2015/223* (2013.01)

(58) Field of Classification Search
CPC ..................................................... G10L 15/00
USPC ............................. 704/257, 9, 255, 256, 500
See application file for complete search history.

(56) References Cited

U.S. PATENT DOCUMENTS

| | | | | |
|---|---|---|---|---|
| 9,824,692 B1* | 11/2017 | Khoury | ................... | G10L 17/18 |
| 10,467,526 B1* | 11/2019 | Appalaraju | .......... | G06K 9/6256 |
| 10,565,318 B2* | 2/2020 | Bradbury | .............. | G06F 40/216 |
| 2018/0052829 A1* | 2/2018 | Lee | ........................ | G06F 40/268 |
| 2018/0060727 A1* | 3/2018 | Rainwater | ............ | G06N 3/0454 |
| 2018/0129937 A1* | 5/2018 | Bradbury | ............. | G06N 3/0445 |
| 2018/0329892 A1* | 11/2018 | Lubbers | ............... | G06K 9/6262 |
| 2018/0349477 A1* | 12/2018 | Jaech | .................. | G06F 16/9535 |
| 2019/0018019 A1* | 1/2019 | Shan | ........................ | G06F 17/16 |
| 2019/0034793 A1* | 1/2019 | Kataria | .................... | G06N 3/04 |
| 2019/0130285 A1* | 5/2019 | Snyder | .................... | G06N 5/022 |
| 2019/0311279 A1* | 10/2019 | Sinha | ................... | G06K 9/6257 |
| 2019/0362703 A1* | 11/2019 | Ijima | ........................ | G06N 3/08 |
| 2020/0034432 A1* | 1/2020 | Jain | .......................... | G06N 3/08 |
| 2020/0042596 A1* | 2/2020 | Ravi | ...................... | G06N 3/084 |

* cited by examiner

*Primary Examiner* — Michael Colucci
(74) *Attorney, Agent, or Firm* — Pierce Atwood LLP

(57) ABSTRACT

A natural language understanding (NLU) system that uses a reduced dimensionality of word embedding features to configure compressed NLU models that use reduced computing resources for NLU tasks. A modified NLU model may include a compressed vocabulary data structure of word embedding data vectors that include a set of values corresponding to a reduced dimensionality of the original word embedding features, resulting in a smaller sized vocabulary data structure and reduced size of the vocabulary data structure. Further components of the modified NLU model perform matrix operations to expand the dimensionality of the reduced word embedding data vectors up to the expected dimensionality of later layers of the NLU model. Additional training and reweighting can adjust for potential loses in performance resulting from reductions in the word embedding features. Thus the modified NLU model can achieve similar performance to an original NLU model with reductions in use of computing resources.

21 Claims, 12 Drawing Sheets

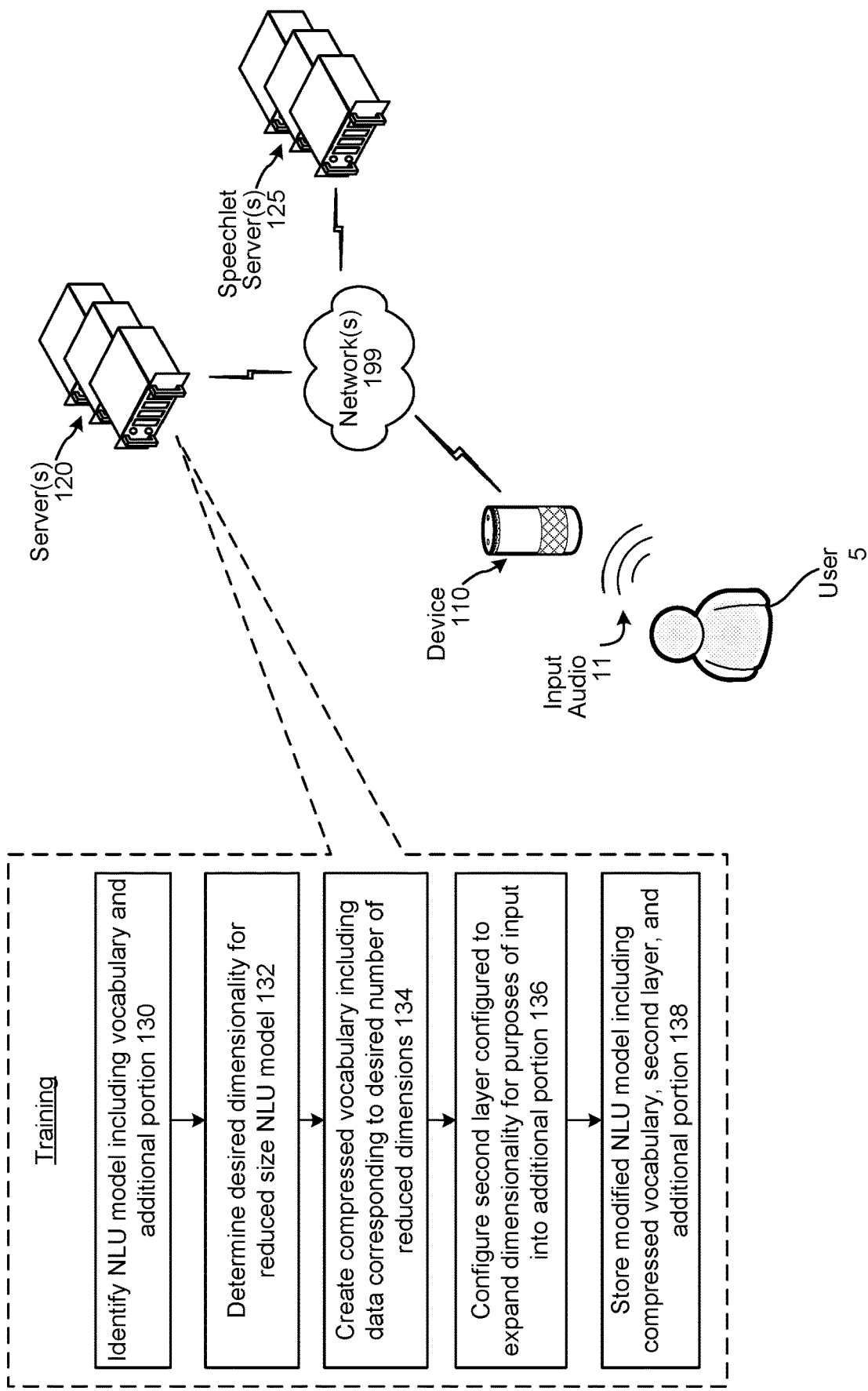

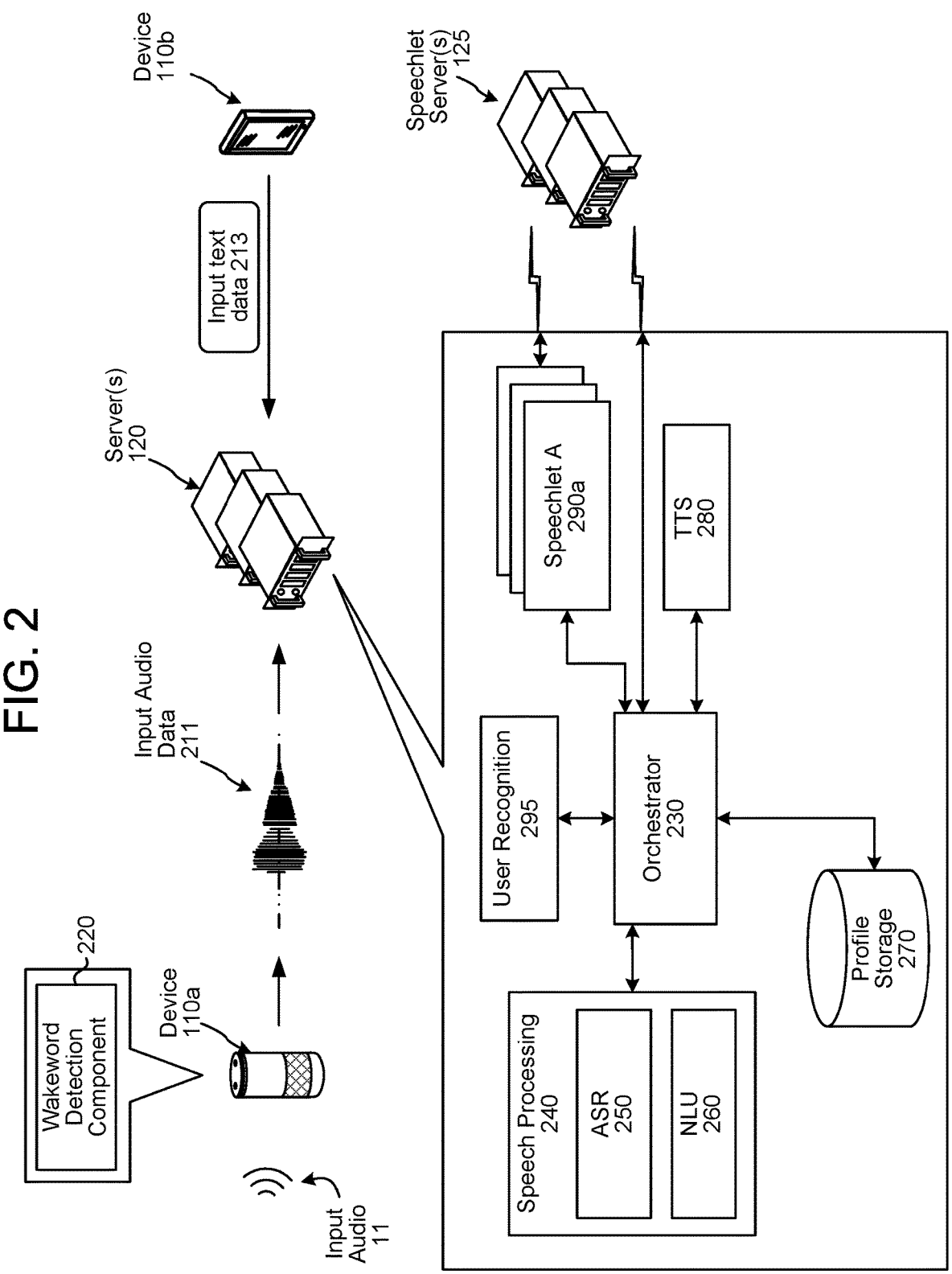

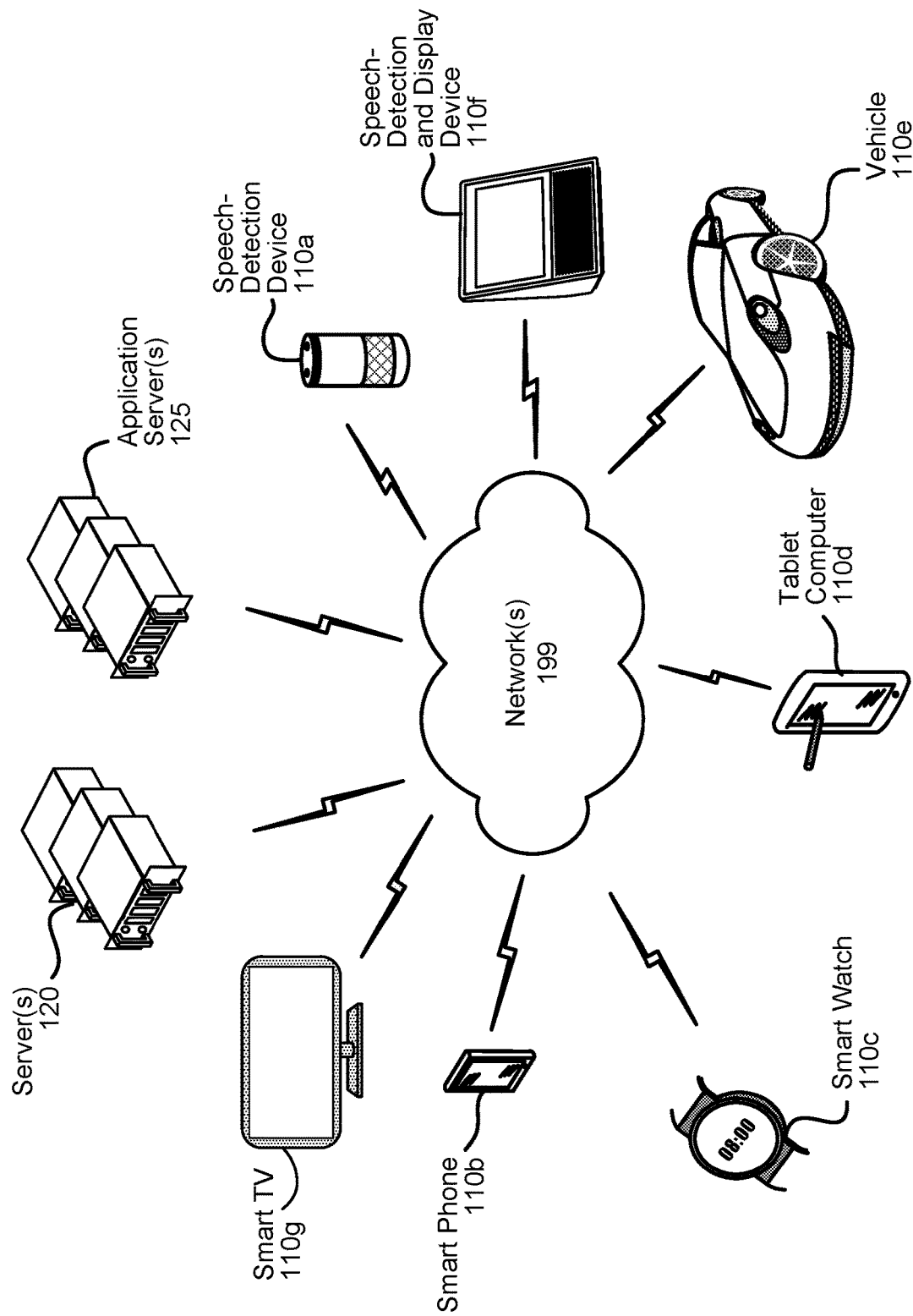

NATURAL LANGUAGE PROCESSING

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A and 1B illustrate a system for creating and using a compressed model for natural language processing according to embodiments of the present disclosure.

FIG. 2 is a conceptual diagram of components of a system according to embodiments of the present disclosure.

FIG. 11 illustrates an example of a computer network for use with the speech processing system.

DETAILED DESCRIPTION

Figure 1B:
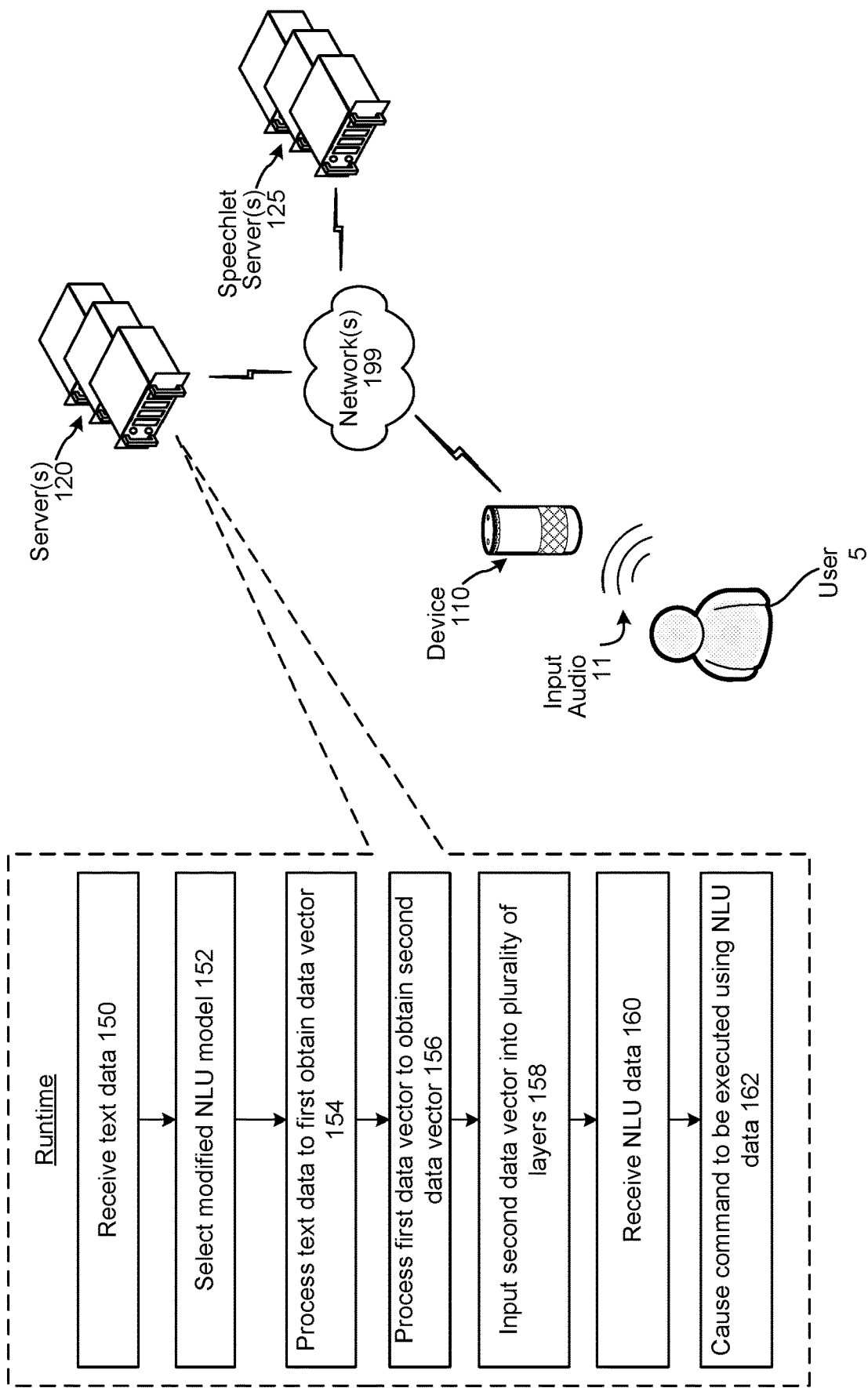

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language. Text-to-speech (TTS) is a field of computer science, artificial intelligence, and linguistics concerned with enabling computers to output synthesized speech. ASR, NLU, and TTS may be used together as part of a speech processing system.

A speech controlled computing system may answer user commands requesting the output of content. For example, a user may say "Alexa, what is the weather." In response, the system may output weather information. For further example, a user may say "Alexa, play Adele." In response, the system may output music sang by Adele.

A generalized speech processing system may be configured to perform many different actions such as outputting media, controlling home devices, making reservations, ordering products, obtaining reviews, playing games, etc. It is a non-trivial task to configure a system to accurately capture audio data for general utterances, be able to process the audio data to determine the user's intent, identify an appropriate executable action for that intent, and select the appropriate component for handling that action to ultimately correctly execute the user's intent and obtain the desired result.

Certain speech processing systems perform NLU to derive a list of intents that potentially relate to an input user command. An intent corresponds to what the user desires a system to do in response to the utterance. During NLU processing the system processes text data corresponding to the user command to determine one or more intents that may correspond to the user utterance. The intent may be represented by a particular action that the system (either alone or in conjunction with other components) can perform. For example, a system may determine an input command of "Play Adele" potentially relates to a <PlayMusic> action and a <PlayVideo> action, since the command may correspond to a request to play Adele music or a request to play an Adele music video.

The process of identifying the intent of an utterance (which may be part of NLU) may be referred to as intent/command classification. The process of identifying an entity (such as a person, place, etc.) in an utterance may involve a two stage process (which also may be part of NLU) where the first stage is entity recognition (where the system recognizes that a portion of the text data refers to an entity) and the second stage is entity resolution (where the system actually matches the text data referring to the entity to a specific entity known to the system). Thus the first stage of entity recognition involves identifying a mention of an entity in text data. This includes identifying particular text portion within the query text that corresponds to the entity. This particular text portion is sometimes called a "slot." As can be appreciated, different entities may share a name even if they are different entities and are understood by the system to be unique and distinct from each other. For example, "Madonna" may refer to either the musical artist, the religious figure, or even to a specific work of art. The second stage of entity resolution actually determines the precise entity that corresponds to the particular text of the slot. As can be appreciated, natural language understanding involves a complex analysis of text (which may be obtained either from a spoken utterance or from some other source) and potentially other data to determine the text's precise meaning.

Certain speech processing systems may divide their capabilities into "domains," where each domain represents a certain subject matter category of a system. For example a system may have a music domain, a video domain, a reservation domain, weather domain, shopping domain, or the like.

Certain speech processing systems may configure speech processing to allow each domain to construct its own catalog of actions the system may execute that correspond to user intents that are processable by the domain. For example a music domain may use a catalog of actions such as <PlaySong>, <PlayAlbum>, <Pause>, or the like, while a reservation domain may use a catalog of actions such as <MakeReservation>, <ConfirmReservation>, <CancelReservation>, or the like. Each domain may also have its own catalog of entities that it may use in executing actions. For example, a music domain may use a catalog of music, a reservation domain may have a catalog of restaurants, etc.

Each domain may be configured with its own intents/commands, slot structure, entities, knowledge base, or the like. Thus, each domain may be configured such that a certain set of words may be expected to be used in one domain while a different set of words may be expected to be used in another domain. Such sets of words may be referred to as a vocabulary. Thus one domain may have one vocabulary, another domain may have another vocabulary, and so on. Different domains may have overlapping words in their respective vocabularies.

As the system may not know what domain the utterance belongs in until the speech processing is complete, during runtime (e.g., when audio data for an incoming utterance is received) a speech processing system may process a single utterance using multiple domains at the same time. Thus domain-specific NLU processing may be configured such that text data for an incoming utterance may be processed (at least partially) in parallel by NLU components for multiple domains and the potential speech processing/NLU results of each domain compared against each other, with the most likely result (e.g., the highest scoring result) being selected to execute on behalf of the user.

Machine learning (ML) is a valuable computing technique that allows computing systems to learn techniques for solving complex problems without necessarily needing an explicit algorithm for the computing system to follow. ML may use a trained model that consists of internally configured operations that can manipulate a particular type of input data to determine a desired result. Trained models are used in many computing tasks such as computer vision, speech processing, predictive analyses, and many more. Specifically, trained models may be used for ASR, NLU and/or TTS processing. For NLU processing trained models may be used for tasks such as intent classification, entity recognition, entity resolution, etc.

Trained models come in a variety of forms including include trained classifiers, Support Vector Machines (SVMs), neural networks (such as deep neural networks (DNNs), recurrent neural networks (RNNs), or convolutional neural networks (CNNs)) and others. As an example, a neural network typically includes an input layer, an output layer and one or more intermediate hidden layers where the input layer is configured to take in a certain kind of data and the output layer is configured to output the desired kind of data to result from the network and the hidden layer(s) perform a variety of functions to go from the input data to the output data. A layer of a trained model such as a neural network may include data that defines a number of nodes (sometimes called "neurons" or "units") and paths between those nodes and nodes of another layer in a model. The paths or nodes may also define a function or kernel where data of a node in the first layer should undergo some operation before the output of the operation is passed to a node of the next layer. The function may be linear or may be non-linear. The function may also use data from multiple input nodes to result in the output data passed to a next node. A variety of functions may be performed as part of a layer, with one typical operation being a matrix multiplication where the terms of the matrix define the specific function's operations carried out by the multiplication. Inputs to a function may also be weighted in certain configurations. Further example activation functions may include a sigmoid operation, tan h operation, ReLU operation, etc.

Various techniques may be used to train ML models including backpropagation, statistical learning, supervised learning, semi-supervised learning, stochastic learning, or other known techniques. In supervised learning a model may be configured to infer a function from labeled training data. Thus a computing system may use training data in the form of training examples that provide examples of the kinds of input data the model will be configured to process at runtime as well as an accompanying "ground truth" for each training example. The ground truth provides the correct response for the respective training example, thus providing a complete example that can be used to train the model. Other data that may be used to train a model may include training parameters such as error functions, weights or other data that can be used to guide the training of a model.

Specifically with regarding to NLU processing, an NLU model may be large in terms of computing store it occupies. Further, the NLU model may require significant computing resources (in terms of memory, processing power, processor time, or the like) for the system to operate the model at runtime. One reason for these requirements is that an NLU model is typically configured to be able to process many forms of text data that may represent many different words and the NLU model is configured to understand many words. For example, for one specific domain an NLU model may be configured to be able to process many thousands of input words. Further, data used to represent a word for purposes of NLU processing may take the form of a word embedding (further explained below) where data in the form of a multi-dimensional vector may be used to represent a word. Thus, an NLU model may be configured to store many thousands of multi-dimensional vectors (each corresponding to a respective word), thus resulting in large NLU models that require large memory allocations and significant computing resources to operate at runtime.

Offered is a system that can configure an NLU model to be smaller for storage purposes as well as less resource intensive for runtime operation. In particular the system may reduce the size of a vocabulary data structure corresponding to word embedding data vectors for words used for the particular NLU purpose. The system may reduce the size of the vocabulary data structure by only including a reduced dimensional set of data, where the reduced set may be obtained from a transformation of the original word embedding feature data. In this manner the size of the vocabulary data structure may be reduced without necessarily reducing the number of words represented by the vocabulary data structure. The reduced size vocabulary data structure can thus be populated with data vectors corresponding to the reduced size. The system may then add a layer to the NLU model that can process data vectors of the reduced size to the size expected for later layers of the original NLU model. The new sized vocabulary data structure and additional layer may then be added to the later layers of the original NLU model to create a modified NLU model that may use fewer computing resources at runtime to perform the operation of the original NLU model.

FIGS. 1A and 1B illustrates a system for creating and using a reduced size NLU model for speech processing according to embodiments of the present disclosure. Although the figures and discussion illustrate certain operational steps of the system in a particular order, the steps described may be performed in a different order (as well as certain steps removed or added) without departing from the intent of the disclosure. Device 110 local to a user 5, one or more server(s) 120, and one or more speechlet servers 125 may communicate across one or more networks 199. The speechlet server(s) 125 may each correspond to a particular speechlet 290 (described below) and may be capable of performing operations to ultimately execute an action.

During system training, the server(s) 120 may identify (130) an NLU model including a first layer having a data structure corresponding to a vocabulary for the NLU model. The NLU model may also have an additional portion corresponding to a further plurality of layers. The vocabulary data structure may correspond to a particular set of words that may be processed by the NLU model. The original vocabulary data structure may include a plurality of word embedding data vectors, where each word embedding data vector corresponds to a respective word that may be used to interact with/invoke the particular NLU operation. Each word embedding data vector may have a certain dimensionality, e.g., may include a certain number of dimensions and values for those dimensions (for example D dimensions), with each dimension d (out of D) corresponding to a particular word embedding feature as established by the particular word embedding configuration and each value corresponding to a value for the respective word for the respective dimension. Thus a word embedding data vector representing a single word would have a dimensionality of 1×D. A matrix or other collection of word embedding data vectors would have a dimensionality of W×D where W is the number of words represented by the particular matrix (be it a vocabulary data structure, representation of an input word string, etc.) and D is the number of dimensions for each word embedding.

The system may determine (132) a desired dimensionality/size for the reduced size NLU model. That is, the system may determine the desired tradeoff between performance and reduction in computing resources for the reduced sized model (for example as discussed below). The system may also determine a dimensionality of a reduced size vocabulary data structure and determine how many dimensions should remain in a modified vocabulary matrix. This may be performed using a singular value decomposition (SVD) operation, as described below. The system may then create (134) a compressed vocabulary data structure including data vectors for each word of the vocabulary where the data vectors of the compressed vocabulary data structure include data for the selected reduced dimensions rather than for data of each of the entirety of word embedding features. The system may include the compressed vocabulary data structure in a first layer of a modified NLU model. The system may also configure (136) a second layer of the modified NLU model for purposes of expanding the data taken from the compressed vocabulary data structure into a matrix or other data structure of the appropriate dimensionality for input into the additional portion of the modified NLU model (e.g., the additional plurality of layers). This operation may include using an operation matrix (such as one that results from an SVD operation) that is configured to complete the mathematical transformation using the compressed vocabulary data structure. The system may then perform some fine-tuning or other adjusting of the first or second layers, and may store (138) the modified NLU model including the first layer (with the compressed vocabulary data structure), the second layer and the additional portion (including the remaining plurality of layers) for later use by the system.

During a runtime operation (such as when a user utterance/command is received by the system), a device 110 may detect input audio 11 corresponding to a spoken utterance originating from the user 5. The device 110 generates input audio data 211 corresponding to the input audio 11 and sends the input audio data 211 to the server(s) 120. The server(s) 120 receives the input audio data 211 from the device 110 and performs ASR on the input audio data to generate text data. Alternatively, the system may receive (150) the text data directly from a device 110 or other source.

The system may select (152) a modified NLU model having the compressed vocabulary data structure and additional layer(s). That is, the system may find such an NLU model that has been prepared and may now be used for performing NLU processing such as part of a recognizer 363 or other component of an NLU system 260 as discussed below. The system may process (154) the text data using a first portion of the NLU model to obtain a first data vector, where the first data vector includes a number of values corresponding to the reduced number of dimensions, as described above. The system may then process (156) the first data vector to obtain a second data vector, where the second data vector has the dimensionality corresponding to the original number of word embedding features. In this manner the second data vector can be input (158) into the remaining plurality of layers (of a second portion of the NLU model) without the plurality of layers having to be reconfigured to input data having the reduced dimensionality of the first data vector. The processing of the first data vector into the second data vector may be performed using the second layer of the modified NLU model and an operation matrix (such as operation matrix 815) as described below.

The system may then receive (160) NLU output data from the plurality of layers and may cause (162) a command to be executed using the NLU output data, for example using other system components and/or the speechlet server(s) 125.

Further details of the system are described below. The system may operate using various components as described in FIG. 2. The various components may be located on a same or different physical devices. Communication between various components may occur directly or across a network(s) 199.

A speech-capture device 110 (e.g., a device that is capable of detecting a user's speech and converting the audio 11 of the speech into audio data 211) may receive input audio 11, corresponding to a spoken utterance corresponding at least in part to a command, using an audio capture component, such as a microphone or array of microphones. The device 110, using a wakeword detection component 220, processes input audio data corresponding to the input audio 11 to determine if a keyword (e.g., a wakeword) is detected in the input audio data. Following detection of a wakeword, the device 110 sends input audio data 211, corresponding to the utterance, to the server(s) 120.

Upon receipt by the server(s) 120, the input audio data 211 may be sent to an orchestrator component 230. The orchestrator component 230 may include memory and logic that enables the orchestrator component 230 to transmit various pieces and forms of data to various components of the system.

The orchestrator component 230 sends the input audio data 211 to a speech processing component 240. An ASR component 250 of the speech processing component 240 transcribes the input audio data 211 into input text data representing one more hypotheses representing speech contained in the input audio data 211. The ASR component 250 interprets the utterance in the input audio data 211 based on a similarity between the utterance and pre-established language models. For example, the ASR component 250 may compare the input audio data 211 with models for sounds (e.g., subword units, such as phonemes, etc.) and sequences of sounds to identify words that match the sequence of sounds spoken in the utterance represented in the input audio data 211. The ASR component 250 sends (either directly or via the orchestrator component 230) the input text data generated thereby to an NLU component 260 of the speech processing component 260. The input text data output by the ASR component 250 may include a top scoring hypothesis or may include an N-best list including multiple hypotheses. An N-best list may additionally include a score associated with each hypothesis represented therein. Each score may indicate a confidence of ASR processing performed to generate the hypothesis with which it is associated.

Alternatively, a device (such as a mobile device 110b) may send input text data 213 to the server(s) 120. Upon receipt by the server(s) 120, the input text data 213 may be sent to the orchestrator component 230. The orchestrator component 230 may send the input text data 213 to the NLU component 260. The input text data 213 may include a string of word identifiers that may correspond to a string of words. Thus, each identifier may indicate a word of the utterance.

The NLU component 260 receives the input text data 213 and attempts to make a semantic interpretation of the phrases or statements represented in the input text data input therein. That is, the NLU component 260 (as described in detail herein) determines one or more meanings associated with the phrases or statements represented in the input text data based on individual words represented in the input text data. The NLU component 260 determines an intent (e.g., an action that a user desires be performed) of a command represented in the input text data as well as pertinent pieces of information in the input text data that allow a device (e.g., the device 110, the server(s) 120, the speechlet server(s) 125, etc.) to execute the intent. For example, if the input text data corresponds to "call mom," the NLU component 260 may determine a user intended to activate a telephone in his/her device and to initiate a call with a contact matching the entity "mom."

When audio data of an utterance is received, ASR is performed to determine text corresponding to the audio data and NLU is performed to determine what intent/action is intended by the utterance. Depending on the NLU output data, an instruction is sent to a speechlet component or skill component for handling the action called for in the utterance.

A "speechlet" component may include software running on the server(s) 120 that is akin to an application. That is, a speechlet 290 may enable the server(s) 120 to execute specific functionality in order to provide data or produce some other output requested by a user. The server(s) 120 may be configured with more than one speechlet 290. For example, a weather service speechlet may enable the server(s) 120 to provide weather information, a car service speechlet may enable the server(s) 120 to book a trip with respect to a taxi or ride sharing service, an order pizza speechlet may enable the server(s) 120 to order a pizza with respect to a restaurant's online ordering system, etc. A speechlet component may include hardware, software, firmware, or the like that may be dedicated to the particular speechlet or shared among different components. The speechlet component may be part of the server(s) 120 (for example as speechlet 290) or may be located at whole (or in part) with separate speechlet server(s) 125. Speechlet server(s) 125 may communicate with speechlets 290 within the server(s) 120 and/or directly with the orchestrator 230 or with other components. For present purposes, unless expressly stated otherwise, reference to a speechlet or speechlet component (such as speechlet 290) may include a speechlet component operating within server(s) 120 and/or speechlet operating within speechlet server(s) 125.

A speechlet 290 may be configured to perform one or more actions. An ability to perform such an action may sometimes be referred to as a "skill." That is, a skill may enable a speechlet component to execute specific functionality in order to provide data or produce some other output requested by a user. A particular speechlet component may be configured to execute more than one skill/action. For example, a weather service skill involve a speechlet component providing weather information to the server(s) 120, a car service skill may involve a speechlet component booking a trip with respect to a taxi or ride sharing service, an order pizza skill may involve a speechlet component ordering a pizza with respect to a restaurant's online ordering system, etc.

A speechlet(s) 290 may be in communication with one or more speechlet servers 125 implementing different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, as well as custom skills that are not associated with any pre-configured type of skill.

In some instances, a speechlet(s) 290 or a speechlet server(s) 125 may provide output text data responsive to the present user command. The server(s) 120 may include a text-to-speech (TTS) component 280 that generates output audio data from speechlet(s) 290 and speechlet server(s) 125 provided output text data. The TTS component 280 may use different synthesis techniques. In one method of synthesis called unit selection, the TTS component 280 matches text data against a database of recorded speech. The TTS component 280 selects units of recorded speech matching the text data and concatenates the units together to form output audio data. In another method of synthesis called parametric synthesis, the TTS component 280 varies parameters such as frequency, volume, and noise to create output audio data including an artificial speech waveform. Parametric synthesis uses a computerized voice generator, sometimes called a vocoder.

The server(s) 120 may include a user recognition component 295. The user recognition component 295 may take as input the input audio data 211 and/or input text data output by the ASR component 250 as well as potential other input data such as video, biometric data, or the like. The user recognition component 295 determines scores indicating whether the command originated from a particular user. For example, a first score may indicate a likelihood that the command originated from a first user, a second score may indicate a likelihood that the command originated from a second user, etc. The user recognition component 295 also determines an overall confidence regarding the accuracy of user recognition operations. The user recognition component 295 may perform user recognition by comparing audio characteristics in the input audio data 211 to stored audio characteristics of users. The user recognition component 295 may also perform user recognition by comparing biometric data (e.g., fingerprint data, iris data, etc.) received by the system in correlation with the present command to stored biometric data of users. The user recognition component 295 may further perform user recognition by comparing image data (e.g., including a representation of at least a feature of a user) received by the system in correlation with the present command with stored image data (e.g., including representations of features of users). The user recognition component 295 may perform additional user recognition processes, including those known in the art. Output of the user recognition component 295 may be used to inform NLU processing as well as processing performed by speechlets 290 and/or speechlet servers 125, routing by the orchestrator 230, or other functions.

The server(s) 120 may include a user profile storage 270. The user profile storage 270 may include a variety of information related to individual users, groups of users, etc. that interact with the system. The user profile storage 270 may include one or more customer profiles. Each customer profile may be associated with a different customer ID. A customer profile may be an umbrella profile specific to a group of users. That is, a customer profile encompasses two or more individual user profiles, each associated with a respective user ID. For example, a customer profile may be a household profile that encompasses user profiles associated with multiple users of a single household. A customer profile may include preferences shared by all the user profiles encompassed thereby. Each user profile encompassed under a single customer profile may include preference data specific to the user associated therewith. That is, each user profile may include preference data unique from one or more other user profiles encompassed by the same customer profile. The preference data may include information indicating what preferences the user has with regard to certain speechlets or other information. A user profile may be a stand-alone profile or may be encompassed under a customer profile. A user profile may also include history data which may be data representative of previous interactions between the user of the user profile and the system. As illustrated, the user profile storage 270 is implemented as part of the server(s) 120. However, it should be appreciated that the user profile storage 270 may be located proximate to the server(s) 120, or may otherwise be in communication with the server(s) 120, for example over the network(s) 199. User profile data may be used to inform NLU processing as well as processing performed by speechlets 290.

Figure 3:
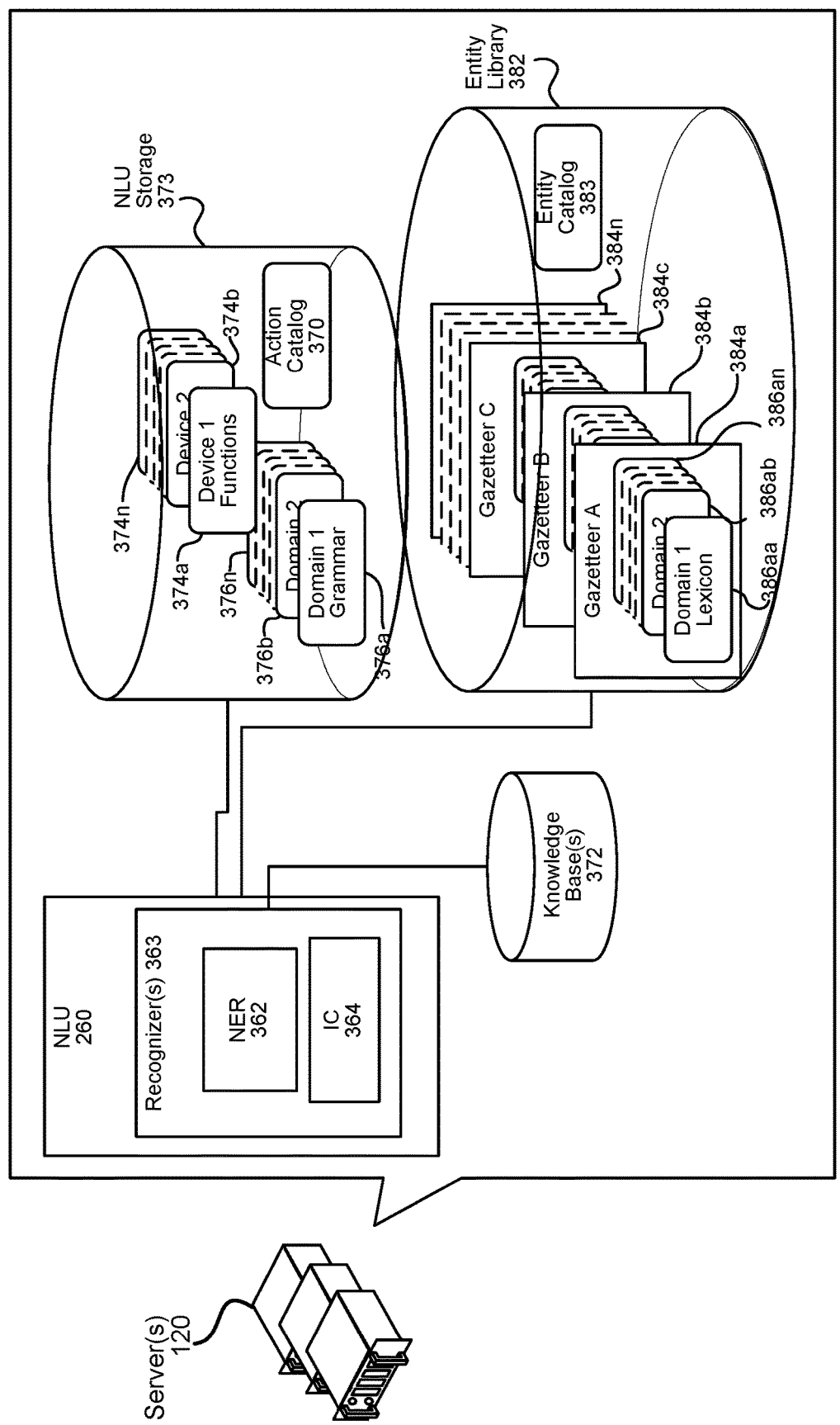
FIG. 3 is a conceptual diagram of how natural language processing is performed according to embodiments of the present disclosure.
Figure 4:
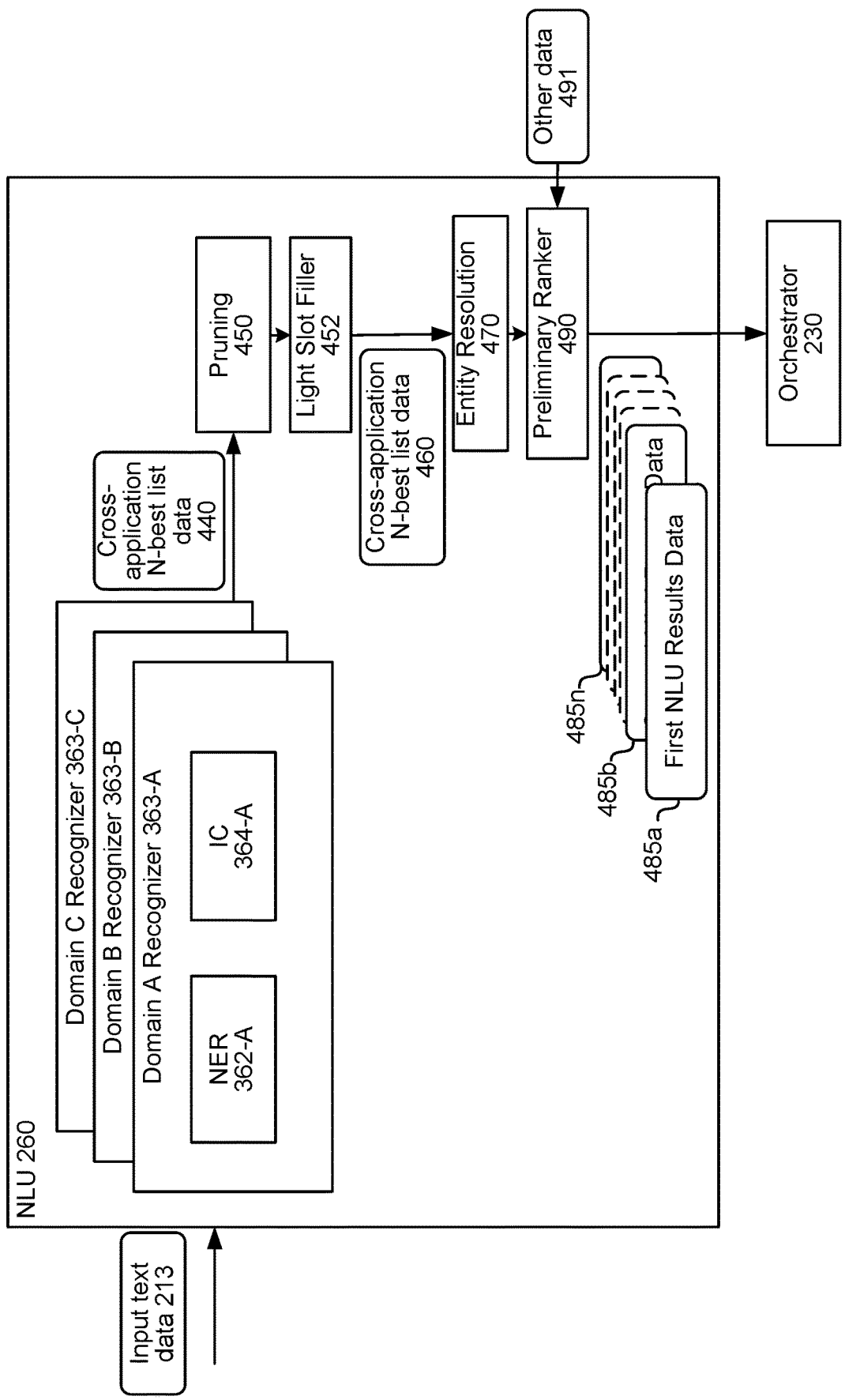
FIG. 4 is a conceptual diagram of how natural language processing is performed according to embodiments of the present disclosure.

FIGS. 3 and 4 illustrate how NLU processing may be performed on input text data. Generally, the NLU component 260 attempts to make a semantic interpretation of text represented in text data. That is, the NLU component 260 determines the meaning behind the text represented in text data based on the individual words. The NLU component 260 interprets text to derive an intent or a desired action of the user as well as the pertinent pieces of information in the text that allow a device (e.g., device 110, server(s) 120, speechlet(s) 290, speechlet server(s) 125) to complete that action.

The NLU component 260 may process text data including several different ASR hypotheses of a single utterance. For example, if the ASR component 250 outputs ASR results including an N-best list of hypotheses, the NLU component 260 may process the text data with respect to all (or a portion of) the textual interpretations represented therein.

The NLU component 260 may include one or more recognizers 363. Each recognizer 363 may be associated with a different domain or "content source" (e.g., a different speechlet 290 or skill). The NLU component 260 may determine a command represented in text data is potentially associated with more than one action. Multiple recognizers 363 may be functionally linked (e.g., a telephony/communications recognizer and a calendaring recognizer may utilize data from the same contact list). Alternatively, the NLU component 260 may use a single recognizer 363 configured to output potential interpretations of the text data independent of domain.

If the NLU component 260 determines a command represented in text data is potentially associated with multiple actions, the recognizers 363 associated with the domains may each process the text data in parallel. For example, if a command potentially implicates both a communications action and a music action, a recognizer associated with the communications domain may process the text data in parallel, or substantially in parallel, with a recognizer associated with the music domain processing the text data. The output generated by each recognizer may be scored to indicate the respective recognizers confidence in its processing of the text data.

The NLU component 260 may communicate with various storages to determine the potential action(s) associated with a command represented in text data. The NLU component 260 may communicate with an NLU storage 373, which includes databases of devices (374a-374n) identifying actions associated with specific devices. For example, the device 110 may be associated with actions for music, calendaring, contact lists, device-specific communications, etc. In addition, the NLU component 260 may communicate with an entity library 382, which includes database entries about specific services on a specific device, either indexed by device ID, user ID, or group user ID, or some other indicator.

Each recognizer 363 may include a named entity recognition (NER) component 362. The NER component 362 attempts to identify grammars and lexical information that may be used to construe meaning with respect to a command represented in text data input therein. The NER component 362 identifies portions of text represented in text data input into the NLU component 260 that correspond to a named entity that may be recognizable by the system. The NER component 362 (or other component of the NLU component 260) may also determine whether a word refers to an entity that is not explicitly mentioned in the utterance text, for example "him," "her," "it" or other anaphora, exophora or the like.

Each recognizer 363, and more specifically each NER component 362, may be associated with a particular grammar model and/or database 376. Each gazetteer 384 may include domain-indexed lexical information associated with a particular user and/or device. For example, the Gazetteer A (384a) includes domain-indexed lexical information 386aa to 386an. A user's music domain lexical information might include album titles, artist names, and song names, for example, whereas a user's contact-list lexical information might include the names of contacts. Since every user's music collection and contact list is presumably different, this personalized information improves entity resolution.

An NER component 362 applies grammar models 376 and lexical information 386 associated with the domain (associated with the recognizer 363 implementing the NER component 362) to determine a mention one or more entities in text data input thereto. In this manner, the NER component 362 identifies "slots" (i.e., particular words in text data) that may be needed for later command processing. The NER component 362 may also label each slot with a type of varying levels of specificity (e.g., noun, place, city, artist name, song name, etc.).

Each grammar model 376 includes the names of entities (i.e., nouns) commonly found in text about the particular domain to which the grammar model 376 relates, whereas the lexical information 386 is personalized to the user(s) and/or the device 110 from which the input audio data 211 or input text data 213 originated. For example, a grammar model 376 associated with a shopping domain may include a database of words commonly used when people discuss shopping.

A downstream process called named entity resolution actually links a portion of text to an actual specific entity known to the system. To perform named entity resolution, the NLU component 260 may utilize gazetteer information (384a-384n) stored in an entity library storage 382. The gazetteer information 384 may be used to match text represented in text data with different entities, such as song titles, contact names, etc. Gazetteers may be linked to users (e.g., a particular gazetteer may be associated with a specific user's music collection), may be linked to certain domain categories (e.g., shopping, music, video, communications, etc.), or may be organized in a variety of other ways. NER and/or entity resolution may also rely on an entity catalog 383 that may include a catalog of entities.

Each recognizer 363 may also include an intent classification (IC) component 364. The IC component 364 parses text data to determine an intent associated with the recognizer 363 that potentially corresponds to the text data. An intent corresponds to an action to be performed that is responsive to the command represented by the text data. The IC component 364 may communicate with a database of words linked to intents/actions. For example, a music intent database may link words and phrases such as "quiet," "volume off," and "mute" to a "mute" intent. The IC component 364 may identify potential actions by comparing words in the text data to the words and phrases in an intents/actions catalog 370. The action catalog 370 may include information about actions that are executable by the speechlets 290. The recognizer(s) 363 may process the text data and attempt to match it with one or more actions of the action catalog 370.

The intents identifiable by a specific IC component 364 may be linked to domain-specific (i.e., the domain associated with the recognizer 363 implementing the IC component 364) grammar frameworks 376 with "slots" to be filled. Each slot of a grammar framework 376 corresponds to a portion of the text data that the system believes corresponds to an entity. For example, a grammar framework 376 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar frameworks 376 may not be structured as sentences, but rather based on associating slots with grammatical tags.

For example, an NER component 362 may parse text data to identify words as subject, object, verb, preposition, etc. based on grammar rules and/or models prior to recognizing named entities in the text data. An IC component 364 (implemented by the same recognizer 363 as the NER component 362) may use the identified verb to identify an intent. The NER component 362 may then determine a grammar model 376 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. The NER component 362 may then search corresponding fields in a lexicon 386 associated with the domain associated with the recognizer 363 implementing the NER component 362, attempting to match words and phrases in the text data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data using heuristic grammar rules, or a model may be constructed using techniques such as hidden Markov models, maximum entropy models, log linear models, conditional random fields (CRF), and the like. For example, an NER component 362 implemented by a music domain recognizer 363 may parse and tag text corresponding to "play mother's little helper by the rolling stones" as {Verb}: "Play," {Object}: "mother's little helper," {Object Preposition}: "by," and {Object Modifier}: "the rolling stones." The NER component 362 identifies "Play" as a verb based on a word database associated with the music domain, which an IC component 364 (also implemented by the music domain recognizer 363) may determine corresponds to a <PlayMusic> intent. At this stage, no determination has been made as to the meaning of "mother's little helper" and "the rolling stones," but based on grammar rules and models, the NER component 362 has determined that the text of these phrases relates to the grammatical object (i.e., entity) of the text data.

The frameworks linked to the intent are then used to determine what database fields should be searched to determine the meaning of these phrases, such as searching a user's gazetteer 384 for similarity with the framework slots. For example, a framework for a <PlayMusic> intent might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve a slot/field using gazetteer information, the NER component 362 may search the database of generic words associated with the domain (in the knowledge base 372). For example, if the text data including text corresponding to "play songs by the rolling stones," after failing to determine an album name or song name called "songs" by "the rolling stones," the NER component 362 may search the domain's vocabulary for the word "songs." In the alternative, generic words may be checked before the gazetteer information, or both may be tried, potentially producing two different results.

The NLU component 260 may tag text to attribute meaning to the text. For example, the NLU component 260 may tag "play mother's little helper by the rolling stones" as: {intent} <PlayMusic>, {artist name} rolling stones, {media type} SONG, and {song title} mother's little helper. For further example, the NLU component 260 may tag "play songs by the rolling stones" as: {intent}<PlayMusic>, {artist name} rolling stones, and {media type} SONG.

The NLU component 260 may compile data, output by the recognizer(s) 363 that processed the text data input to the NLU component 260, into a single N-best list, and may send N-best list data 440 (representing the N-best list) to a pruning component 450 (as illustrated in FIG. 4). Each entry in the N-best list data 440 may correspond to tagged text output by a different recognizer 363. Each entry in the N-best list data 440 may be associated with a respective score indicating the tagged text corresponds to the domain associated with the recognizer 363 from which the tagged text was output. For example, the N-best list data 440 may be represented as:

[0.95] Action: <PlayMusic> ArtistName: Lady Gaga SongName: Poker Face

[0.70] Action: <PlayVideo> ArtistName: Lady Gaga VideoName: Poker Face

[0.01] Action: <PlayMusic> ArtistName: Lady Gaga AlbumName: Poker Face

[0.01] Action: <PlayMusic> SongName: Pokerface ContentSource: Music Skill

The pruning component 450 creates a new, shorter N-best list (i.e., represented in N-best list data 460 discussed below) based on the N-best list data 440. The pruning component 450 may sort the tagged text represented in the N-best list data 440 according to their respective scores.

The pruning component 450 may perform score thresholding with respect to the N-best list data 440. For example, the pruning component 450 may select entries represented in the N-best list data 440 associated with a score satisfying a condition (e.g., meeting and/or exceeding a score threshold). The pruning component 450 may also or alternatively perform number of entry thresholding. For example, the pruning component 450 may select the top scoring entry(ies) associated with each different category of domain (e.g., music, shopping, communications, etc.) represented in the N-best list data 440, with the new N-best list data 460 including a total number of entries meeting or falling below a threshold number of entries. The purpose of the pruning component 450 is to create a new list of top scoring entries so that downstream, more resource intensive processes may only operate on the tagged text entries that most likely correspond to the command input to the system.

The NLU component 260 may also include a light slot filler component 452. The light slot filler component 452 can take text from slots represented in the tagged text entry(ies) output by the pruning component 450 and alter it to make the text more easily processed by downstream components. The light slot filler component 452 may perform low latency operations that do not involve heavy operations such as reference to a knowledge base. The purpose of the light slot filler component 452 is to replace words with other words or values that may be more easily understood by downstream components. For example, if a tagged text entry includes the word "tomorrow," the light slot filler component 452 may replace the word "tomorrow" with an actual date for purposes of downstream processing. Similarly, the light slot filler component 452 may replace the word "CD" with "album" or the words "compact disc." The replaced words are then included in the N-best list data 460.

The NLU component 260 sends the N-best list data 460 to an entity resolution component 470. The entity resolution component 470 can apply rules or other instructions to standardize labels or tokens from previous stages into an intent/slot representation. The precise transformation may depend on the domain (e.g., for a travel domain, the entity resolution component 470 may transform a text mention of "Boston airport" to the standard BOS three-letter code referring to the airport). The entity resolution component 470 can refer to an authority source (e.g., a knowledge base) that is used to specifically identify the precise entity referred to in each slot of each tagged text entry represented in the N-best list data 460. Specific intent/slot combinations may also be tied to a particular source, which may then be used to resolve the text. In the example "play songs by the stones," the entity resolution component 470 may reference a personal music catalog, Amazon Music account, user profile (described herein), or the like. The entity resolution component 470 may output data including an altered N-best list that is based on the N-best list represented in the N-best list data 460, but also includes more detailed information (e.g., entity IDs) about the specific entities mentioned in the slots and/or more detailed slot data that can eventually be used by a speechlet. The NLU component 260 may include multiple entity resolution components 470 and each entity resolution component 470 may be specific to one or more speechlet.

The entity resolution component 470 may not be successful in resolving every entity and filling every slot represented in the N-best list data 460. This may result in the entity resolution component 470 outputting incomplete results. The NLU component 260 may include a final ranker component 490, which may consider such errors when determining how to rank the tagged text entries for potential execution. For example, if a book domain recognizer 363 outputs a tagged text entry including a <ReadBook> intent flag, but the entity resolution component 470 cannot find a book with a title matching the text of the item, the final ranker component 490 may re-score that particular tagged text entry to be given a lower score. The final ranker component 490 may also assign a particular confidence to each tagged text entry input therein. The confidence score of a particular tagged text entry may be affected by whether the tagged text entry has unfilled slots. For example, if a tagged text entry associated with a first domain includes slots that are all filled/resolved, that tagged text entry may be associated with a higher confidence than another tagged text entry including at least some slots that are unfilled/unresolved.

The final ranker component 490 may apply re-scoring, biasing, or other techniques to obtain the most preferred tagged and resolved text entry. To do so, the final ranker component 490 may consider not only the data output by the entity resolution component 470, but may also consider other data 491. The other data 491 may include a variety of information. For example, the other data 491 may include domain rating or popularity data. For example, if one domain has a particularly high rating, the final ranker component 490 may increase the score of a tagged text entry(ies) associated with or otherwise invoking that particular domain. The other data 491 may also include information about domains that have been specifically enabled by the user. For example, the final ranker component 490 may assign higher scores to tagged text entries associated with or otherwise invoking enabled domain s than tagged text entries associated with or otherwise invoking non-enabled domain s. User history may also be considered, such as if the user regularly uses a particular domain or does so at particular times of day. Date, time, location, weather, type of device 110, user ID, context, and other information may also be considered. For example, the final ranker component 490 may consider when any particular domains are currently active (e.g., music being played, a game being played, etc.). Following final ranking, the NLU component 260 may output NLU output data 485 to the orchestrator component 230. The NLU output data 485 may include various entries, with each entry representing an NLU processing confidence score, an intent, slot data, and a potential skill or speechlet that may operating with respect to the respective entry's data.

Figure 5:
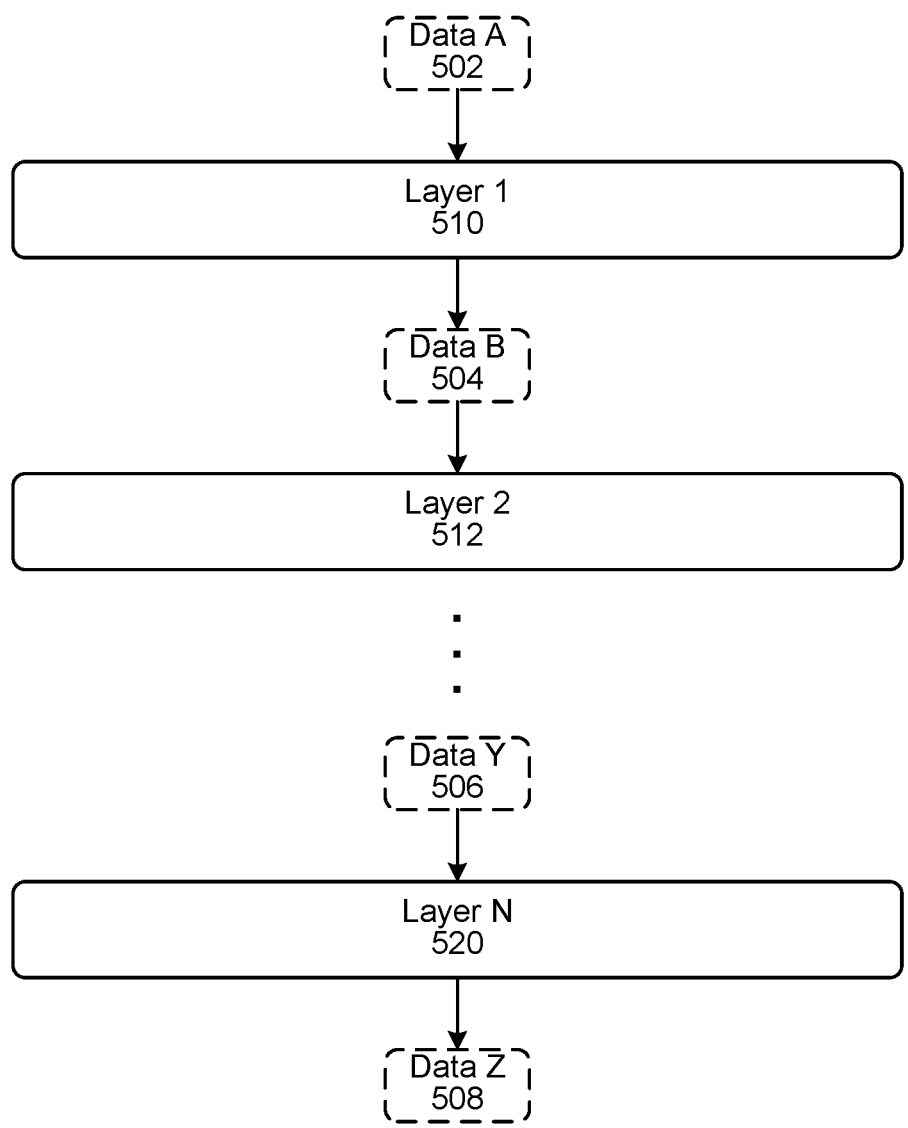
FIG. 5 is a conceptual diagram illustrating layers of a trained model according to embodiments of the present disclosure.

One or more NLU components, such as NER component 362, component 364, entity resolution component 470, etc. may use trained models for operation. A trained model may take many forms, including a neural network. As illustrated in FIG. 5, a neural network may include a number of layers, from input layer 1 510 through output layer N 520. Each layer is configured to operate on a particular type of data with the resulting output of the operation being potentially another type of data. The neural network illustrated in FIG. 5 is configured to input data of type data A 502 (which is the input to layer 1 510) and output data of type data Z 508 (which is the output from the last layer N 520). The output from one layer is then taken as the input to the next layer. For example, the output data (data B 504) from layer 1 510 is the input data for layer 2 512 and so forth such that the input to layer N 520 is data Y 506 output from the penultimate layer (not shown).

While values for the input data/output data of a particular layer are not known until a neural network is actually operating during runtime, the data describing the neural network (such as the data available for trained model 220) describes the structure and operations of the layers of the neural network.

An NLU model, such as a neural network may be configured to use word embeddings in their operations. A word embedding is a representation of a word in the form of a multi-dimensional data vector, where each dimension represents some data point regarding the word, its usage, or other information about the word. To create word embeddings a text corpus is obtained that represents how words are used. The text corpus may include information such as books, news content, internet articles, etc. The system then create multiple vectors, each corresponding to the usage of a particular word (e.g., the usage of the word in the source text corpus), and map those vectors into a vector space. Given the number of dimensions for each vector, the vector space may be a high dimensional vector space. The different dimensions for each data vector may correspond to how a word is used in the source text corpus. Thus the word embedding data represented in the individual values of a word embedding data vector may correspond to how the respective word is used in the corpus.

A number of known techniques for manipulating vectors in high dimensional (or other) vector space may be used to compare analyze vectors and compare vectors to each other. One example for representing and analyzing word usage characteristic as vectors with word embedding data is the GloVe: Global Vectors for Word Representation project by Jeffery Pennington, Richard Socher, and Christopher D. Manning of the Computer Science Department of Stanford University published in 2014. Other word embedding techniques and/or formats may be used. Further, vectors are one example of tracking and comparing word usage characteristics, other techniques may be used.

Figure 6:
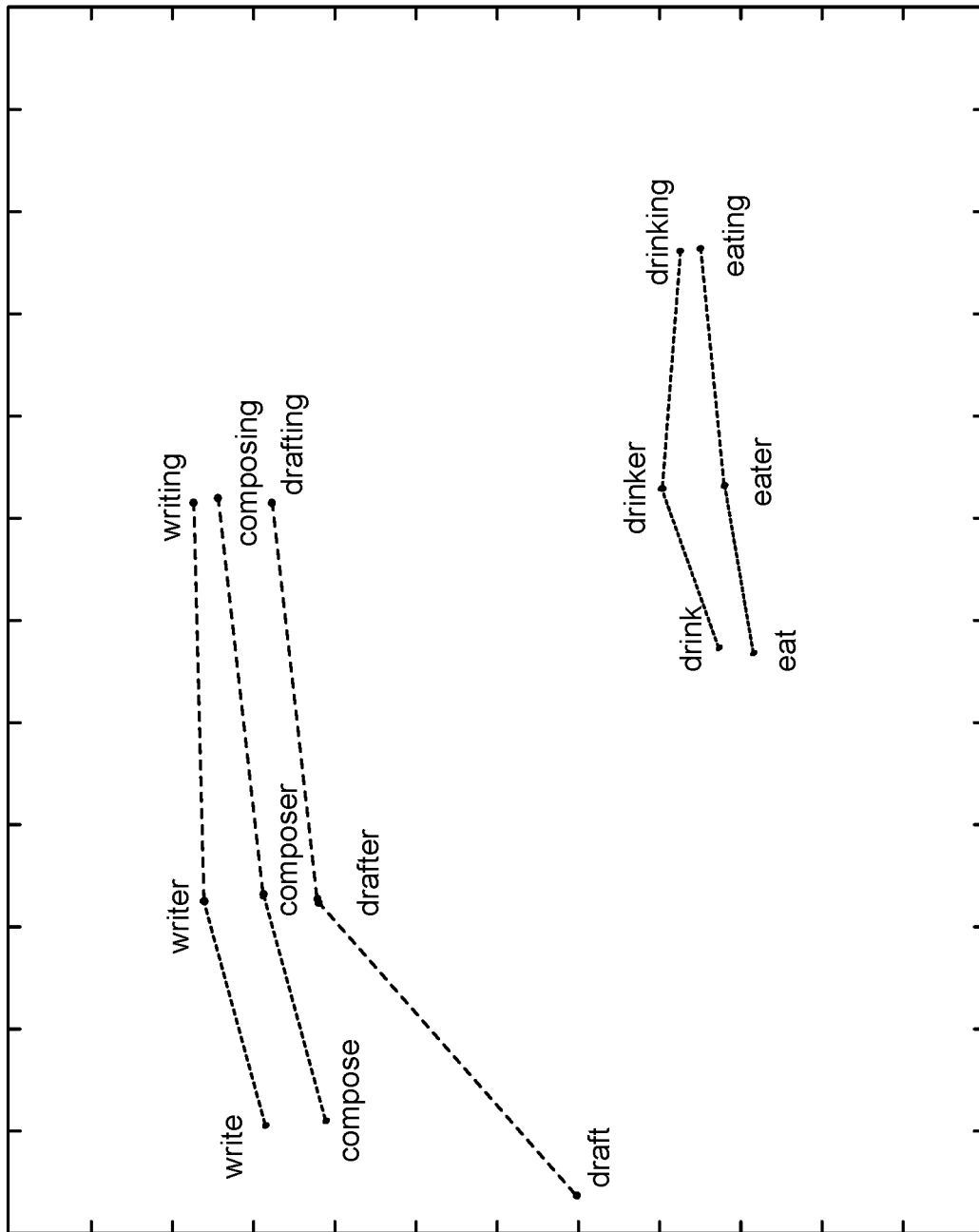
FIG. 6 illustrates representations of word usage similarity in a vector space.

Representing words in a vector space may be useful for showing the relationship between usage of individual words, as well as showing the relationship between usage of variations of a particular word and showing the relationship between the same usage variation across different word roots. Thus, a vector space may be used to represent sematic relationships between words as geometric relationship between vectors. For example, FIG. 6 illustrates a number of words in a hypothetical vector space where each point represents the vector location for the particular word. Although illustrated as located in a two-dimensional graph for discussion purposes, the usage vectors for the words illustrated in FIG. 6 would be in a high dimensional space. Further, FIG. 6 is shown for example purposes only and the vector locations/relationships do not necessarily reflect a true graphing of the usage of the illustrated words.

As illustrated in FIG. 6, certain words that have similar meaning may be close to each other in the vector space (indicating a similarity of usage characteristics). Also, certain words that have different meanings may also be close to each other in the vector space (also indicating a similarity of usage characteristics). In the top portion of the illustration, words "writer," "composer" and "drafter" are located near each other, indicating that those three words are used similarly in the word data used to generate the vectors of FIG. 6. Similarly, the words "writing," "composing" and "drafting" are also located near each other, also indicating that those three words are used similarly. The words "write," "compose," and "draft" are not as close in the illustration, with "draft" in particular being located farther away from "write" and "compose" than those words are to each other. This distance may be due to other uses of the word "draft" that may differ from "write" and "compose," for example, "draft" has a known noun form, where the "write" and "compose" do not and "draft" may also have other meanings (such as a cold interior breeze) that differ from "write" and "compose."

Further, the variations of the words (save for "draft") have similar usage relationships relative to each other. For example, the usage relationships of "write" to "writer" to "writing" is similar to the usage relationship between "compose" to "composer" to "composing" as shown by the lines connecting those triplets of words. Other, non-illustrated variations may also exist (such as "writes," "drafted," etc.) with their own vectors and usage relationships to other words.

Creating word embeddings may be an intensive process and thus a pre-trained word embedding system may be used for multiple NLU processes. One such word embedding format is GloVe, mentioned above. Others include word2vec described in Distributed Representations of Words and Phrases and their Compositionality by Tomas Mikolov, Kai Chen, Greg Corrado, and Jeffrey Dean, published in 2013, fasttext described in Enriching Word Vectors with Subword Information by Piotr Bojanowski, Edouard Grave, Armand Joulin, and Tomas Mikolov in 2016, and others. To use such representations, an NLU component may include the appropriate word embedding data vectors within its model, so that when the NLU component receives, at runtime, the input text data/word string, it may activate the respective embeddings for the words of the utterance and perform its NLU task accordingly. Thus, for example, an NLU model may include the word embedding data vectors for 10000 words that are likely to be used by the model. At runtime, if a three word long word string is received as input to the NLU, the NLU model may activate the three word embedding data vectors for that three word long word string and use those three word embedding data vectors in its processing to determine some output NLU data (e.g., intent, slot indications, etc.).

Figure 7:
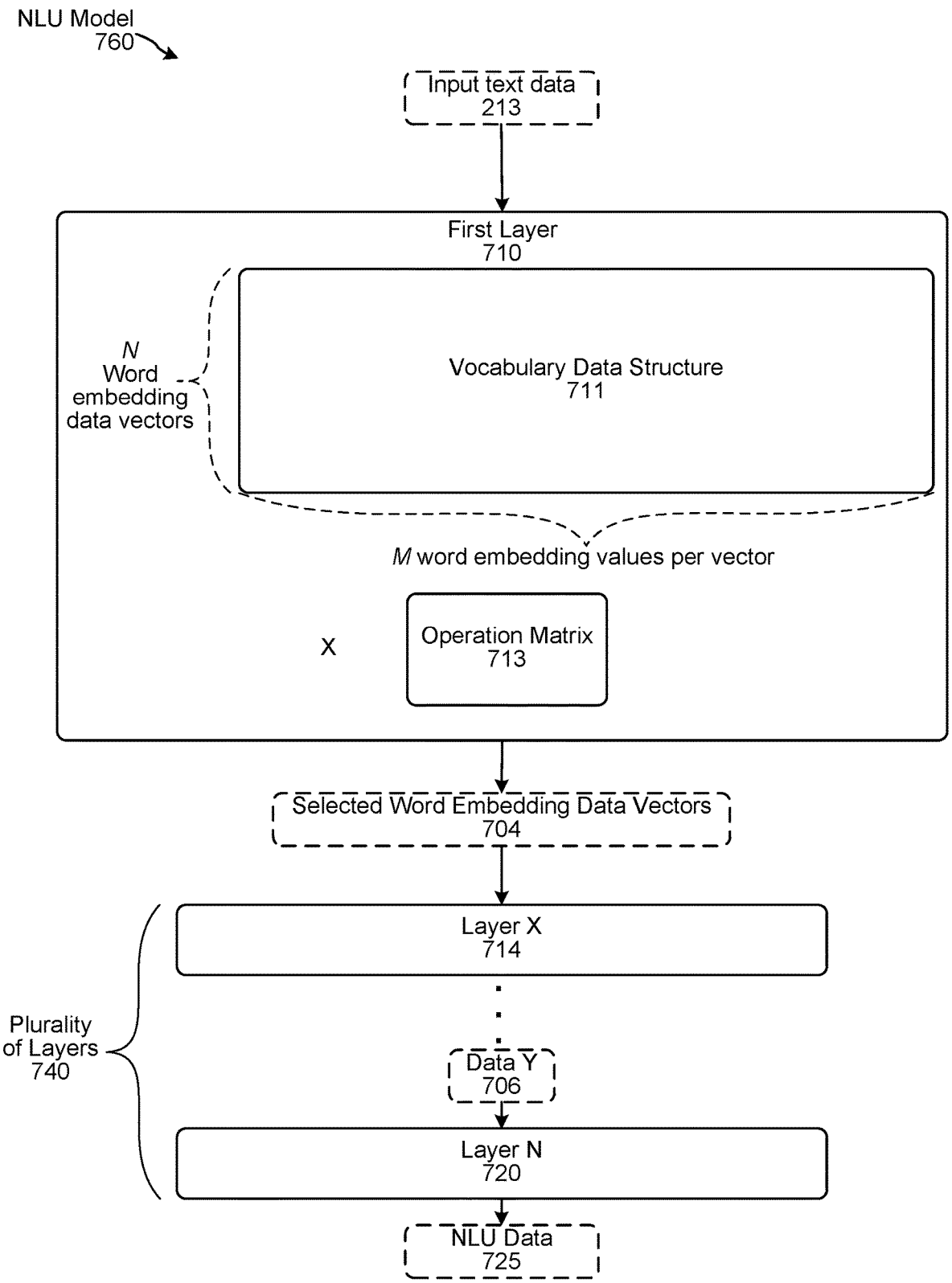
FIG. 7 illustrates an NLU model.

For example, FIG. 7 illustrates an NLU model 760. The model 760 includes data (such as tables, data structures, etc.) corresponding to a number of layers (including first layer 710 and the plurality of layers 740 which includes initial layer X 714 through final layer N 720). In this manner the first layer 710 may be considered a first portion of the NLU model 760 and the plurality of layers 740 may be considered a second portion of the NLU model 760. Although the term "portion" may be used to describe some aspect of an NLU model, a "portion" may itself constitute its own independent model, depending on system configuration. Thus, the "first portion" of NLU model 760 may be its own model configured to operate on input data such as input text data 213 and to, as a result of processing, create output data such as selected word embedding data vectors 704. Similarly, the "second portion" of NLU model 760 may be its own model configured to operate on input data such as selected word embedding data vectors 704 and to, as a result of processing, create output data such as NLU data 725. The model 760 may be configured to perform some NLU related task (such as IC, NER, entity resolution, text parsing, parts of speech tagging, or the like) such that the ultimate output of the model 760 is some NLU data 725 which may include an indication of an intent, indication of slot in text, an entity label, etc. depending on the particular model 760. The first layer 710 of the model 760 may incorporate a vocabulary data structure 711 of words that the model may consider in its operation. The vocabulary data structure 711 may correspond to N number of words. Depending on the subject matter category of the NLU model 760 and/or its function, N may be of varying size, but a typical NLU vocabulary may include thousands of words. For each word the vocabulary data structure 711 may include a word embedding data vector having M number of values. As noted above, M may be several hundred values. Thus the vocabulary data structure 711 may include a data structure of the size N×M. As can be appreciated, FIG. 7 is not to scale as N is typically significantly larger than M. None of the figures herein are intended to be to scale unless otherwise noted.

The first layer 710 of the NLU model 760 may be configured to take as input text data 213 which may correspond to a word string (e.g., a sequence of words corresponding to an utterance or other input for NLU processing). The input text data 213 may include the words themselves or index numbers corresponding to where in the vocabulary data structure 711 the respective word embedding data vectors for the particular words may be found. The first layer 710 then takes the input text data 213 and populates certain values in an operation matrix 713 corresponding to the input words. The operation matrix 713 may thus include a series of one-hot vectors (e.g., a 1×N vector with only one value set to 1 and the other values set to 0) where the set value of each one-hot vector corresponds to a word of the input word string The vocabulary data structure 711 is then multiplied by the operation matrix 713 to obtain the word embedding data vectors corresponding to the words of the input word string and outputs those as the selected word embedding data vectors 704. Thus, the first layer 710 outputs a sequence of W word embedding vectors of size M, where W is the number of words in the word string. Thus data 704 may be W 1×M word embedding data vectors.

As an example, if input text data 213 corresponded to the word string "make a call" (i.e., W=3) and each word embedding data vector includes 300 values (i.e., M=300) the selected word embedding data vectors 704 would include three vectors with 300 dimensions/values each, with each respective vector (or each respective row/column of a matrix combining the vectors) corresponding to the three words "make" "a" and "call." The data for those three vectors would then be input to the rest (740) of the NLU model 760.

The NLU model 760 thus also includes a plurality of additional layers 740 that are collectively configured to data (e.g., input word embedding data vectors) having a dimensionality of M (i.e., having M values along one dimension) and process that data using initial layer X 714 and then the remainder of the plurality of layers 740 to eventually output the NLU data 725 through an operation using final layer N 720. The plurality of additional layers 740 may include a variety of different layers configured to perform a variety of different internal functions to eventually output the NLU data 725. The layers may, for example, include long short-term memory (LSTM) layers, matrix multiplications, etc. The initial layer X 714 of the plurality of additional layers is configured to be used to operate on data having the dimensionality/number of values M. Layer X then performs some operation on that input and passes its output to the other layers of the plurality of layers 740 until the final layer N 720 that is used to perform an operation that results in the NLU data 725. The NLU data 725 may include indications of intent, slots, named entity resolution results or other NLU data depending on the configuration of the NLU model 760.

One drawback to this approach is the size of the word embeddings. For example, if an NLU component needs to handle input of many thousands of different words, it may also store the word embedding data vectors for each of those words. If the word embedding data vectors being used by the system each correspond to 300 different features/dimensions (e.g., each word embedding data vector includes 300 values), a word embedding matrix for one million tokens (e.g., words) can be up to 2 Gbs on a 64 bit system. Having multiple such matrices in memory can be prohibitively expensive. Retraining the word embedding data vectors to be smaller may not be practical, even if the system had access to the text corpus as retraining word embeddings is resource intensive and doing so may not be practical for multiple different domains, NLU models, etc. that may operate in a comprehensive speech processing system.

Further, performing a matrix multiplication of the vocabulary data structure 711 may require a significant amount of computing resources given the large size of the vocabulary data structure.

To improve upon these operations, the present system may use compressed word embeddings (e.g., reduced dimensionality data based on the word embedding data) to split the processing of early layers of a trained model thus resulting in a trained model that uses less storage as well as less computing resources at runtime. Models that use compressed word embeddings may be fine-tuned to regain any accuracy that may be lost as a result of using compressed, rather than full, word embeddings.

While a specific word embedding format/protocol (such as GloVe or other system discussed above) may be configured to use word embedding data vectors with M values, those M values/dimensions were likely determined so the word embedding data vector may be used for many different tasks thus the feature data represented by the M values/dimensions may not necessarily be as useful for certain NLU techniques as for others. Thus, for a specific NLU operation, some transformation of the word embedding data may be more efficient than using all the M word embedding features, thereby enabling the system to use smaller dimensionality data to perform specific operations.

A compressed word embedding data vector is a word embedding data vector that includes a low rank (e.g., reduced dimensionality) projection of original word embedding data vector for the specific word. Thus if a particular word embedding typically has M dimensions, only K dimensions will be used to represent a particular word, where K is smaller than M A full word embedding data vector of dimension M for a specific word is thus projected into a K dimension vector also representing the same specific word, only smaller in size. K may not necessarily be a direct subset of the M original dimensions as the transformation may be based on original word embedding data that may not ultimately reflected in the compressed word embedding data vector, depending on the transformation/low-rank projection. Thus, if a NLU component typically stores word embedding data vectors for a vocabulary data structure including N words, instead of the NLU component needing to store data for N×M dimensions, it only needs to store data for N×K dimensions, resulting in a storage savings of N×(M−K) dimensions. The system may insert layers or other processing to expand each eventual word embedding data vector from K dimensions/values back up to M dimensions/values at runtime so the remainder of the NLU model (which may be trained to operate on data vectors with M dimensions/values) can operate as normal. Selection of the specific K dimensions and the resulting transformation to arrive at values for those K dimensions for a specific word may be determined using various techniques and refinements (which may be performed in offline operations prior to runtime) and may also be dependent on the domain, functionality, or other characteristic of the specific NLU model. Thus, one NLU model (for example to perform IC in domain A) may use one set of dimensions $K_1$ (and resulting transformation from M to $K_1$). while a different NLU model (for example to perform NER in domain B) may use a different set of dimensions $K_2$ (and resulting transformation from M to $K_2$).

By using compressed word embedding data vectors, the system may reduce both the size of an NLU model. Further, by compressed smaller word embedding data vectors, the system may reduce the complexity of the matrix operations performed by the NLU model. The combined smaller NLU model size and reduced size matrix operations overall result in reduced computing resources needed to perform NLU operations. Examples of these reductions are discussed below.

Figure 8:
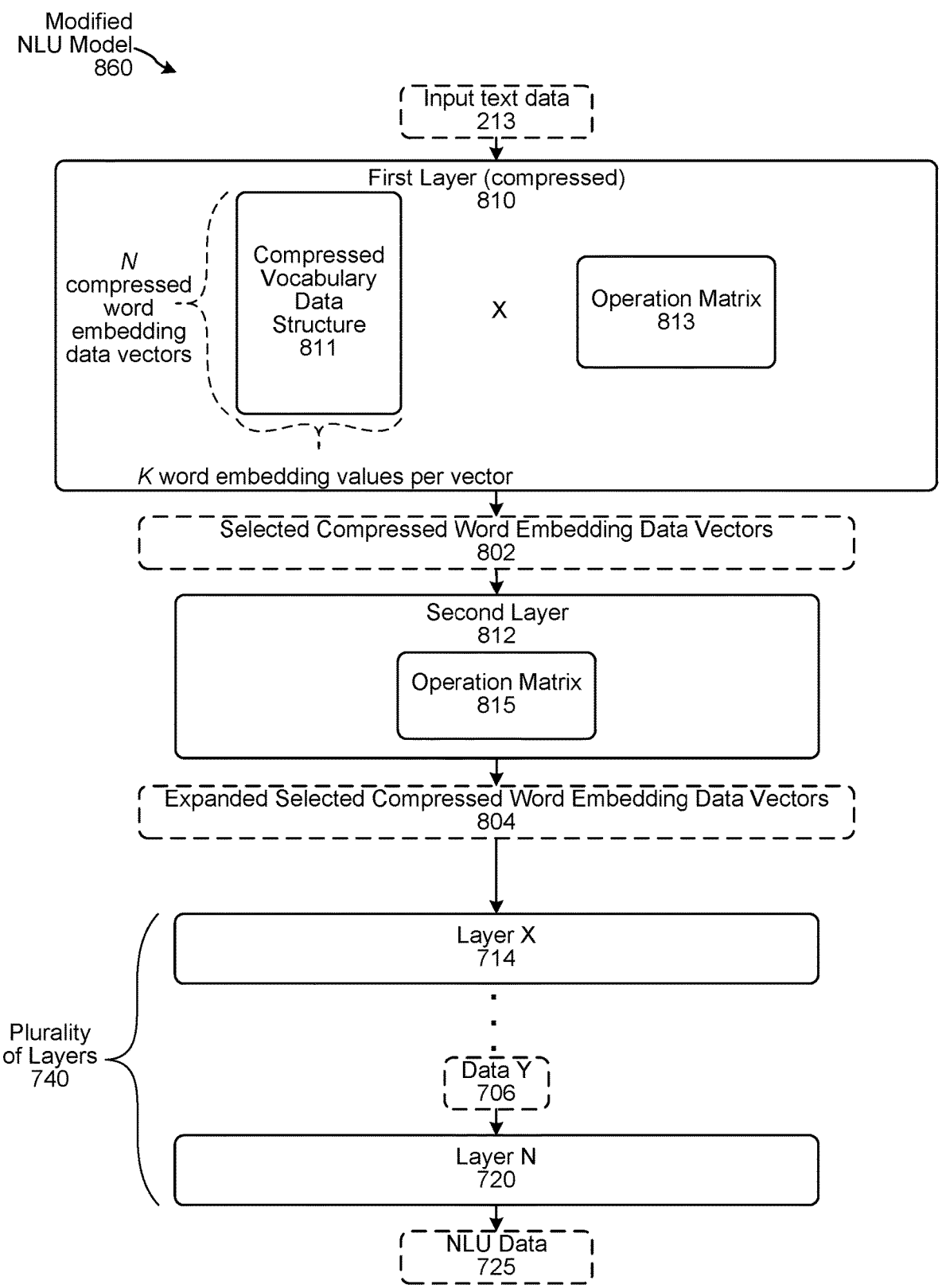
FIG. 8 illustrates a modified NLU model according to embodiments of the present disclosure.

For example, a modified NLU model 860 is illustrated in FIG. 8. The modified model 860 includes data (such as tables, data structures, etc.) corresponding to a number of layers (including first layer 810, second layer 812, and the plurality of layers 740 which includes initial layer X 714 through final layer N 720). The plurality of layers 740 in the modified NLU model 860 may be the same as the plurality of layers 740 in the original NLU model 760. Thus, layer X 714 of the modified NLU model 860 is (similar to layer X 714 of the original NLU model 760) configured to take input having the dimensionality/number of values M and then perform some operation on that input and pass its output to the other layers of the plurality of layers 740 until the last layer that outputs the eventual NLU data 725. The NLU data 725 which may include an indication of an intent, indication of slot in text, an entity label, named entity resolution results etc. depending on the configuration of the particular modified NLU model 860.

Compressed first layer 810 of the modified NLU model 860, however, is different from first layer 710 of the original NLU model 760. In particular, compressed first layer 810 includes a compressed vocabulary data structure 811, where the compressed vocabulary data structure includes compressed word embedding data vectors for the words N of the vocabulary, where each compressed word embedding data vector includes only K number of values rather than M number of values, where K is smaller than M. Thus the dimension of compressed vocabulary data structure is N×K, resulting in a storage savings corresponding to the reduction of N×(M−K) in the size of the vocabulary data structure. Thus, each individual respective compressed word embedding data vector includes fewer data dimensions than its respective original word embedding data vector, as the compressed vector includes K dimensions rather than the original set of M values.

Thus, at runtime when input text data 213 is input to the compressed first layer 810, the compressed first layer 810 uses the input text data to identify where in the compressed vocabulary data structure 811 the respective compressed word embedding data vectors for the particular words may be found. The compressed first layer 810 takes the input text data 213 and populates certain values in an operation matrix 813 corresponding to the input words. Like operation matrix 713 with regard to the original NLU model 760, the operation matrix 813 may thus include a series of one-hot vectors (e.g., a 1×N vector with only one value set to 1 and the other values set to 0) where the set value of each one-hot vector corresponds to a word of the input word string. The compressed vocabulary data structure 811 is then multiplied by the operation matrix 813 to obtain the compressed word embedding data vectors corresponding to the words of the input word string and outputs those as the selected compressed word embedding data vectors 802. Thus, the compressed first layer 810 outputs a sequence of W compressed word embedding vectors of size K, where W is the number of words in the word string. Thus data 802 may be W 1×K compressed word embedding data vectors. The data in each compressed word embedding data vector comprises word embedding data that is a result of the transformation from dimension M to dimension K. While the specific values may not directly match one of the specific M values of an original word embedding vector corresponding to a specific word, the transformed word embedding data K of the compressed word embedding data vector may still be considered word embedding data values, only transformed and of a reduced dimensionality from the original word embedding data values corresponding to a particular format (such as GloVe, etc.).

As an example, if input text data 213 corresponded to the word string "make a call" (i.e., W=3) and each compressed word embedding data vector includes 30 values (i.e., K=300) the selected compressed word embedding data vectors 802 would include three vectors with 30 dimensions/values each, with each respective vector (or each respective row/column of a matrix combining the vectors) corresponding to the three words "make" "a" and "call." The data for those three vectors would then be output by the compressed first layer 810.

However, because layer X 714 of the plurality of layers 740 is configured to be used to operate on data vectors of a dimension M rather than a dimension K, further operations may be performed on the selected compressed word embedding data vectors 802 (which may be represented by a matrix having a reduced dimensionality of size W×K) to obtain data with a dimension M (e.g., represented by a matrix of size W×M) so that it may be processed by the plurality of layers 740. Thus, the modified NLU model 860 may include a second layer 812 that performs necessary matrix multiplication (and/or other operations) to process the data of the selected compressed word embedding data vectors 802 into expanded selected compressed word embedding data vectors 804, which may have the expanded dimensionality of W×M for input into the plurality of layers 740. For example, the second layer 812 may multiply the selected compressed word embedding data vectors 802 by another operation matrix 815 to arrive at the expanded selected compressed word embedding data vectors 804, where the operation matrix 815 is configured such that its multiplication by the data with dimension K (such as a matrix of compressed word embedding data vectors) results in data with dimension M, thus matching the dimensionality of the original word embedding data vectors. The operation matrix 815 may thus be configured to transform the data for dimension K back to dimension M The data in the expanded selected compressed word embedding data vectors 804 may thus include a low-rank projection of the original word embedding data vectors for the input word string. The specific operations performed by the second layer 812 may depend on the particular K selected for the particular modified NLU model 860.

As can be appreciated, different respective modified NLU models 860 may use a different respective second layer 812 (and a different operation matrix 815 within their respective second layer 812) to ultimately arrive at the respective expanded selected compressed word embedding data vectors 804 for the particular modified NLU model 860.

Thus, the modified NLU model 860 replaces the original first layer 710 of original NLU model 760 with compressed first layer 810 and second layer 812. The remainder of the modified NLU model 860 (specifically, the plurality of layers 740) may remain the same as the original NLU model 760.

In this manner the first layer 810 along with the second layer 812 may be considered a first portion of the modified NLU model 860 and the plurality of layers 740 may be considered a second portion of the modified NLU model 860. As noted above, although the term "portion" may be used to describe some aspect of an NLU model, a "portion" may itself constitute its own independent model, depending on system configuration. Thus, the "first portion" of modified NLU model 860 may be its own model configured to operate on input data such as input text data 213 and to, as a result of processing, create output data such as expanded selected compressed word embedding data vectors 804. Similarly, the "second portion" of modified NLU model 860 may be its own model configured to operate on input data such as expanded selected compressed word embedding data vectors 804 and to, as a result of processing, create output data such as NLU data 725. Thus, the "first portion" of modified NLU model 860 may include both the first layer 810 and the second layer 812 (either as a stand-alone model or as part of the modified NLU model 860) and the "second portion" of modified NLU model 860 may include the plurality of layers 740 (either as a stand-alone model or as part of the modified NLU model 860), which may be similar to a "second portion" of original NLU model 760. Other configurations of portions are also possible depending on system configuration. For example, in certain embodiments, a first portion of modified NLU model 860 may only be a stand-alone model corresponding to first layer 810 while a different stand-alone model may correspond to second layer 812, etc.

Use of the modified NLU model 860 rather than the original NLU model 750 may reduce computing resources in at least two ways. First, the modified NLU model 860 may require less memory to store as it includes the compressed vocabulary data structure 811 rather than the original vocabulary data structure 711 of the original NLU model 750.

Second, operation of the NLU model 860 in arriving at data the expanded selected compressed word embedding data vectors 804 may use fewer computing resources than the original model arriving at the selected word embedding data vectors 704. This is due to the factorization of the original matrix to lower-rank matrices. For an original matrix $B \in R^{m \times n}$ of rank r, then there exists a factorization $B = B_a \times B_b$, where $B_a$ and $B_b$ are full rank matrices of respective dimensions m×r and r×n which reduces the total number of parameters from mn to (m+n)r. Thus, to reduce the number of parameters in B by a fraction of p the following should hold $$r < \frac{pmn}{(m+n)}$$

The original vocabulary data structure 711 may be factorized in this manner to arrive at the compressed vocabulary data structure 811 and to result in the computing savings (e.g., fewer floating point operations (flops)) of doing several multiplications of smaller matrices rather than a multiplication of a very large matrix, such as original vocabulary data structure 711.

As noted above, of the original word embedding values per data vector M, the compressed vocabulary data structure may include only K values per data vector. Those K values represent transformed word embedding data as an original M values for a particular word are transformed/compressed to the reduced dimensionality K values. To select the K values to include, the system may perform one or more singular value decomposition (SVD) operations to select operations for removal. SVD is a known operation that separates an operation into a ranked list of the operation's constituent parameters (called principle components or eigenvectors/eigenvalues) that combine to make up the operation. In particular, a SVD operation separates an operation (e.g., an m×n real or complex matrix A) into the product of three matrices UΣV* where U is an m×m unitary matrix, Σ is an m×n rectangular diagonal matrix with non-negative real numbers on the diagonal, and V is an n×n unitary matrix (and V* is the conjugate transpose of V). The diagonal entries $\sigma_i$ of Σ are known as the singular values of M. The columns of U are called the left-singular vectors of M and are a set of orthonormal vectors of MM*. The columns of V are called the right-singular vectors of M and are a set of orthonormal vectors of M*M. The non-zero singular values of M (found on the diagonal entries of Σ) are the square roots of the non-zero eigenvalues of both M*M and MM*.

Using known techniques the SVD operation may result in a ranked list that includes a list of the principle components along with a cumulative score corresponding to each component as to how well that component, and the components above it on the list, impact the original operation. The component that most impacts the original operation is at the top of the ranked list, followed by the component that next most heavily impacts the original operation, and so on. Thus, the ranked list following a SVD operation may be a list in the form of, for example:

| Component | Cumulative Score |
| --- | --- |
| Component-1 | 50% |
| Component-2 | 61% |
| Component-3 | 67% |
| ... | |
| Component-N | 100% |

Thus, the top component of an original operation impacts the original operation with a score of 50%, but the top two components of the original operation together would approximate the original function by a score of 61%. These approximation scores may be used to select a certain number K of the original components M. In this manner, K of the original word embedding features M may be selected for inclusion (and appropriate transformation) in the compressed vocabulary data structure 811.

As noted above, the diagonal entries $\sigma_i$ of Σ are known as the singular values of M. To select the K number of parameters to keep, the system may select K values corresponding to the highest diagonal values of σ. This may be done in a number of ways, for example determining a number K and then selecting those with the highest σ, selecting a threshold value for σ and then selecting the features whose σ scores are above the threshold and setting that number for K, or other techniques.

Thus, if the original vocabulary data structure 711 (called A below) includes N word embedding data vectors (corresponding to N words), where each data vector has M values, the original vocabulary data structure 711 (called $A_{N \times M}$ below) can be factorized using a singular value decomposition (SVD) operation into K principal components as follows:

$$A_{N \times M} = U_{N \times K} \Sigma_{K \times K} V_{K \times M}^* = U_{N \times K} Y_{K \times M} \quad (1)$$

$$Y_{K \times M} = \Sigma_{K \times K} V_{K \times M}^* \quad (2)$$

If $A_{N \times M}$ is the original vocabulary data structure 711 of size N×M, $U_{N \times K}$ (is the compressed vocabulary data structure 811 of size N×K. $Y_{K \times M}$, as determined by the SVD operation, may be used as the operation matrix 815, which now may be used to generate data of the appropriate dimensionality to be input into the remaining plurality of layers 740 of the modified NLU model 860.

Thus, if the original vocabulary data structure includes 10,000 words with 300 word embedding feature values per word, matrix A would be a 10,000×300 matrix. If K=30, Y (for example as determined by the SVD operation) would be a 300×30 matrix that transforms the data of the 300 word embedding feature values into 30 dimensions and U would be a 10,000×30 matrix where each word of the 10,000 words of the vocabulary corresponds to 30 data values of the transformed word embedding data.

Thus, at runtime, when the system processes (154) text data to obtain a first data vector (e.g., a selected compressed word embedding data vector 802) that may include the system multiplying the compressed vocabulary data structure 811 by an operation matrix 813 (which may include a series of one-hot vectors where the set value of each one-hot vector corresponds to a word of the input word string as represented by the input text data 213) to get the selected compressed word embedding data vector(s) 802 which include the compressed word embedding data for the words of the input text data, where the compressed word embedding data has the smaller dimensionality. (That is, the dimensionality of selected compressed word embedding data vector(s) 802 that is created from an operation using the first portion of the modified NLU model 860 (e.g., output from an operation using first layer 810) is smaller than the dimensionality of expanded selected compressed word embedding data vector(s) 804 used as input to the second portion of the modified NLU model 860.)

Further, when the system processes (156) the first data vector (e.g., a selected compressed word embedding data vector 802) to obtain the second data vector (e.g., an expanded selected compressed word embedding data vector 804) that may include the system multiplying the selected compressed word embedding data vector 802 by the operation matrix 815 to obtain the expanded selected compressed word embedding data vector 804. As part of that process the system may simply be inserting zero values into certain locations in the expanded selected compressed word embedding data vector 804 (e.g., filling certain dimensions of 804 with zero values). The system may also be inserting non-zero values into certain locations in the expanded selected compressed word embedding data vector 804 as a result of the transformation from the reduced dimensionality of the selected compressed word embedding data vector 802 to the expanded dimensionality of the expanded selected compressed word embedding data vector 804 sufficient for processing using, for example, initial layer X 714 of the plurality of layers 740.

Selection of the K principal components using the SVD (or other selection) operation, and resulting creation of the compressed vocabulary data structure 811, may occur with regard to the specific operation to be performed by the model, which may thus be specific to the model's function (e.g., IC, NER, parts of sentence tagging, parsing, other classification, etc.), domain/subject matter category (music, video, sports), speechlet, or the like. As word embedding systems (such as those mentioned above) are typically created for general use, a number of the features that are included in a word embedding data vector may not be particularly useful for a specific NLU category or operation. By selecting the K principal components with the specific NLU model operation and category in mind, the system may determine K that works best for the specific NLU model in consideration. As can be appreciated, this may lead to different SVD (or other selection) operations and different values for K being included for different NLU models depending on domain, operation, or the like. To maintain certain performance operations, however, the number of words N represented in the compressed vocabulary data structure 811 may be the same as the number of words N represented in the original vocabulary data structure 711. This ensures that the modified NLU model 860 is configured to process the same words as the original NLU model 760. Thus reductions in the size of the respective vocabularies result from reductions in the size of the word embedding vectors in the vocabulary data structure rather than a reduction in the number of words of the vocabulary (though such word number reductions may also be made in certain circumstances).

The pre-trained word embeddings of the original vocabulary data structure 711 may include features designed for general purpose use (e.g., as defined by GloVe or another word embedding options such as those described above). By performing selection of a reduced number of features (such as through SVD) that may be useful for a specific purpose (such as the operation of the NLU model), rather than training a whole new word embedding system for the specific purpose of the NLU model, the system may save on computing resources as training a whole new word embedding system requires significantly more resources than identifying a reduced number of features.

While a certain individual feature of the resulting K features may have a one-to-one mapping to an original feature of the M features (which may, for example, result in the particular value of that M feature in an original word embedding data vector simply being carried over, albeit to a potentially different location, in a compressed word embedding vector), others of the K features may be the result of some merging (in some manner) of multiple original M features, where the resulting value for the individual K feature may be some transformation of one or more of the original M features. The precise transformation operation for the M features to the K features may be determined as part of the training operations of the modified NLU model 860 and may rely, for example, on the SVD and/or fine tuning operations. The transformation operation may then be used to create values for the K features for the individual compressed word embedding data vectors for the words of the vocabulary, thus creating the data for the compressed vocabulary data structure 811 from the data in the original vocabulary data structure 711.

As can be appreciated, the smaller the number K, the greater the reductions in use of computing resources. However, removing a number of components (e.g., features) from the original word embedding data vectors and using only the K features may result in some performance loss, where results using the compressed NLU model 860 and corresponding operations may not yield the same results as using the original NLU model 760 and corresponding operations. To manage this, particular steps may be taken to select the K specific to the operation to be performed by the specific NLU model as well as fine tuning operation of the compressed NLU model 860 prior to deployment at runtime. The specific K features included may depend on the desired level of compression (e.g., reduction in storage size and reduction in runtime computing resources needed) of the resulting modified NLU model 860 as well as the acceptable performance loss.

Thus, once K is selected, and portions of a modified NLU model 860 constructed, fine tuning operations may be performed to adjust the weights included in certain layers of the modified NLU model 860 (including weights in first layer 810, second layer 812 or in the plurality of layers 740) to improve desired performance of the modified NLU model 860. The fine-tuning may involve, for example, adjusting of weights of the operation matrices 813 and/or 815. For example, after configuration of the compressed vocabulary data structure 811 and operation matrices 813 and 815, some testing may occur of the modified NLU model 860 and adjustment of weights within the original operation matrices 813 and/or 815 to improve desired performance. The reweighted operation matrices 813 and/or 815 may then be incorporated into the modified NLU model 860 for deployment and operation at runtime. Such fine tuning may remove/reduce the impact of noise that may be acquired when compressing the original vocabulary data structure (and other components) from M dimensions to the low-rank representation of K dimensions.

Depending on system configuration, multiple versions of a modified NLU model 860 may be available with each different version offering different savings as to computing resources used at runtime and different performance tradeoffs. Depending on server load or other operating conditions (such as details of the particular NLU request being processed) the system may select the particular NLU model to use at runtime. For example, the system may have an original NLU model 760 for a particular NLU task for a particular subject matter. The system may configure a first modified NLU model 860-A that is 75% the size of the original model, offers a certain amount of processor savings during operation, yet suffers from a first potential accuracy loss. The system may also configure a second modified NLU model 860-B that is 50% the size of the original model, offers a greater amount of processor savings during operation, yet suffers from a second potential accuracy loss that is greater than the first. At runtime the system may compare current conditions to some comparison data and determine that one or more conditions are satisfied and thus may determine to select the first modified NLU model 860-A for use at runtime rather than the second modified NLU model 860-B (or the original NLU model 760) even though all three models may be configured to perform a same operation (only with different internal configurations). Further, one size of a model may be deployed on a local device 110, whereas another size of a model may be deployed on a server 120. Further, certain NLU operations (for example intent classification) may be reasonably robust with greater compression than other NLU operations (for example named entity recognition). Thus different NLU operations may be configured with models of different compression.

The modified NLU model 860 may then be used instead of the original NLU model 760 for the same purposes of the original NLU model 760 in NLU operations, for example those operations described herein with regard to FIGS. 3, 4, etc. Although the above describes the process of creating the modified NLU model 860 as starting with an original NLU model 760 and then perform various operations to arrive at the compressed vocabulary data structure 811 and resulting data, it may be possible to start with a reduced sized model, that is start by configuring a reduced size vocabulary data structure (e.g., vocabulary data structure with K dimensions per word vector rather than M), and configuring the remainder of the model accordingly. However, starting with the original sized model 760 and then arriving at the modified NLU model 860 may offer certain advantages. In particular, a compressed model created from an original model may offer improved results rather than starting at the reduced sized model. This may be a result of certain information being preserved if a higher dimensionality model is compressed. If the system starts with a low-rank model at the outset, the information from the higher dimensionality model is not available in the first instance.

Although the above disclosure focuses on the use of NLU models, the teachings above regarding compressed vocabularies, adjusted matrices, etc. may be applied to any number of other models. In particular, other speech or language processing models where a large vocabulary data structure may be stored as part of the model, thus presenting the opportunity for savings of computing resources by applying the above techniques.

Further, the above techniques may be used with many different types of models including classifiers, neural networks, support vector machines, etc.

Figure 9:
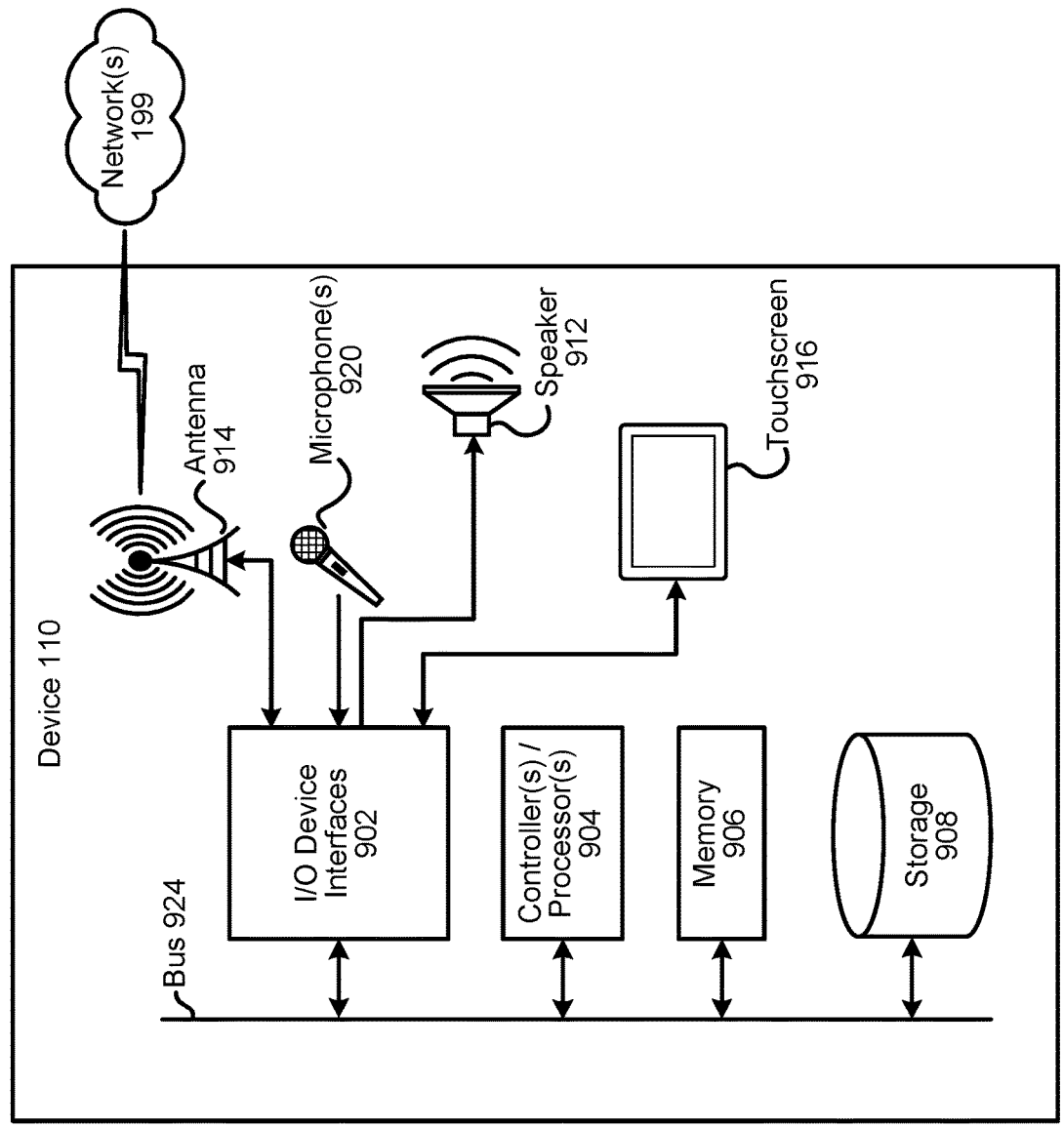
FIG. 9 is a block diagram conceptually illustrating example components of a device according to embodiments of the present disclosure.
Figure 10:
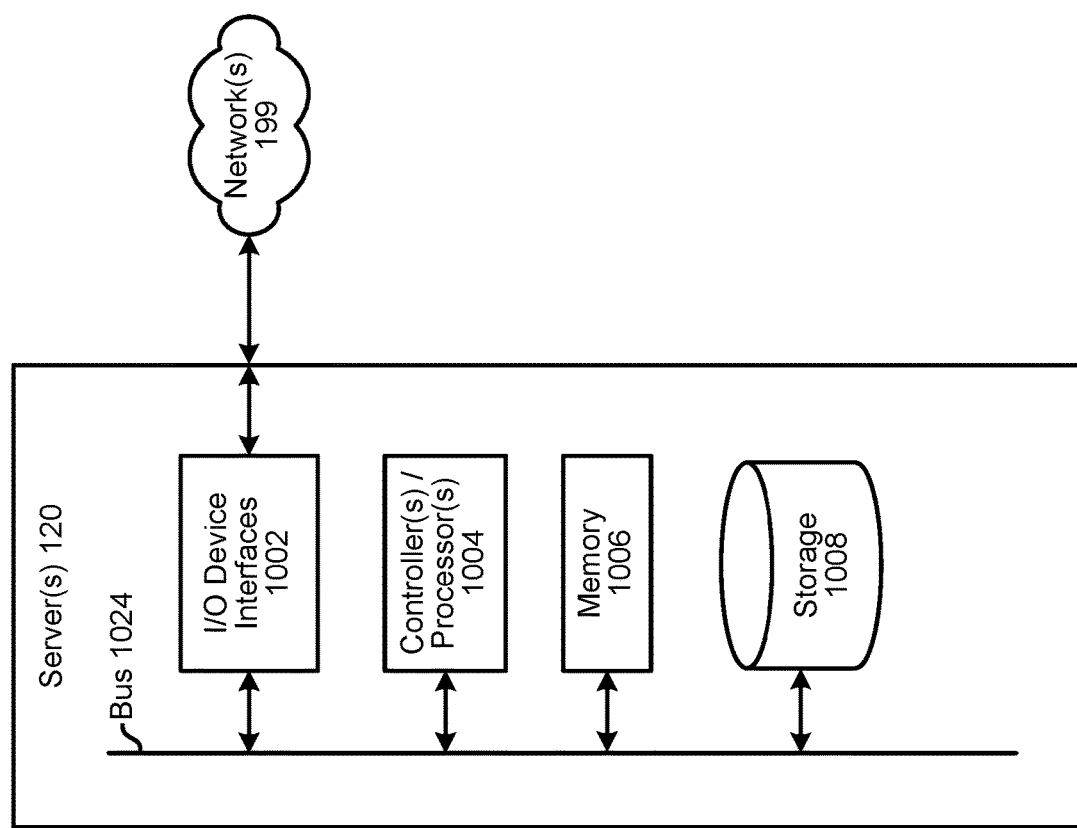
FIG. 10 is a block diagram conceptually illustrating example components of a server according to embodiments of the present disclosure.

FIG. 9 is a block diagram conceptually illustrating a user device 110 that may be used with the system. FIG. 10 is a block diagram conceptually illustrating example components of a remote device, such as the server(s) 120, which may assist with ASR processing, NLU processing, or command processing. Multiple servers 120 may be included in the system, such as one or more servers 120 for performing ASR, one or more servers 120 for performing NLU, etc. In operation, each of these devices (or groups of devices) may include computer-readable and computer-executable instructions that reside on the respective device (110/120), as will be discussed further below. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Each of these devices (110/120) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (902/1002).

Computer instructions for operating each device (110/120) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120) includes input/output device interfaces (902/1002). A variety of components may be connected through the input/output device interfaces (902/1002), as will be discussed further below. Additionally, each device (110/120) may include an address/data bus (924/1024) for conveying data among components of the respective device. Each component within a device (110/120) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 912, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 916 for displaying content.

Via antenna(s) 914, the input/output device interfaces 902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system 100 may be distributed across a networked environment. The I/O device interface (902/1002) may also include communication components that allow data to be exchanged between devices such as different physical servers in a collection of servers or other components.

The components of the device(s) 110 and the server(s) 120 may include their own dedicated processors, memory, and/or storage. Alternatively, one or more of the components of the device(s) 110 and the server(s) 120 may utilize the I/O interfaces (902/1002), processor(s) (904/1004), memory (906/1006), and/or storage (908/1008) of the device(s) 110 and server(s) 120, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and the server(s) 120, as described herein, are exemplary, and may be located as a stand-alone device or may be included, in whole or in part, as a component of a larger device or system.

As illustrated in FIG. 11, multiple devices (110a-110g, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection and display device 110f, and/or a smart TV 110g may be connected to the network(s) 199 through a wireless service provider, over a WiFi or cellular network connection, or the like. Other devices are included as network-connected support devices, such as the server(s) 120, speechlet server(s) 125, or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving a word string including at least a first word;
selecting a first model to perform a natural language understanding (NLU) operation, the first model including:
a first layer including a data structure corresponding to a plurality of words potentially used with the NLU operation, the data structure including a plurality of data vectors, each data vector corresponding to a respective word and to a first dimensionality of word embedding data,
a second layer including a first matrix configured to be used to transform data having the first dimensionality to data having a second dimensionality, the second dimensionality corresponding to a pre-configured word embedding format, and
a plurality of additional layers including at least:
an initial layer configured to be used to operate on input word embedding data having the second dimensionality, and
a final layer configured to be used to output NLU data;
processing the word string to determine a second matrix;
multiplying the data structure by the second matrix to determine at least a third matrix including first word embedding data corresponding to the first word, the first word embedding data having the first dimensionality;
multiplying the third matrix by the first matrix to determine a fourth matrix, the fourth matrix including second word embedding data corresponding to the first word, the second word embedding data having the second dimensionality;
processing the fourth matrix using the plurality of additional layers to determine first NLU output data; and
causing an action to be performed using the first NLU output data.

2. The computer-implemented method of claim 1, further comprising, prior to receiving the word string:
determining, using the NLU operation, a reduced number of word embedding features corresponding to the NLU operation;
identifying an existing model configured to perform the NLU operation, the existing model comprising:
a layer including a second data structure corresponding to the plurality of words potentially used with the NLU operation, the second data structure including a second plurality of data vectors, each data vector of the second plurality corresponding to a respective word and to the second dimensionality, and
the plurality of additional layers;
using the second data structure and the reduced number of word embedding features, configuring the data structure to include the plurality of data vectors;
configuring the second layer; and
storing data corresponding to the first model.

3. The computer-implemented method of claim 2, wherein determining the reduced number of word embedding features comprises:
using data corresponding to the NLU operation, performing a singular value decomposition (SVD) operation using data corresponding to the reduced number of word embedding features;
selecting, using output from the SVD operation and data corresponding to desired performance of the first model, the reduced number of word embedding features; and
after the selecting, configuring a plurality of weights of the first matrix.

4. A computer-implemented method comprising:
receiving text data corresponding to at least a first word;
selecting a model for performing natural language understanding (NLU) processing, the model including a first portion and a second portion, the second portion including a plurality of layers wherein:
an initial layer of the plurality of layers is configured to be used to operate on input word embedding data having a first dimensionality, and
a final layer of the plurality of layers is configured to be used to output NLU data;
processing the text data using the first portion to obtain a first data vector corresponding to the first word, the first data vector including word embedding data having a second dimensionality, the second dimensionality being smaller than the first dimensionality;
processing the first data vector to obtain a second data vector corresponding to the first word, the second data vector having the first dimensionality;
processing the second data vector using the initial layer of the plurality of layers; and determining, as a result of an operation using the final layer of the plurality of layers, first output NLU data corresponding to at least the first word.

5. The computer-implemented method of claim 4, wherein the first portion comprises a data structure representing a vocabulary of words corresponding to an NLU operation corresponding to the model, the data structure corresponding to the second dimensionality.

6. The computer-implemented method of claim 5, wherein processing the text data using the first portion comprises:
   multiplying a matrix representing words of the text data by the data structure to obtain at least the first data vector.

7. The computer-implemented method of claim 4, wherein the first portion further comprises a matrix configured to be used to transform data having the second dimensionality to data having the first dimensionality.

8. The computer-implemented method of claim 7, wherein processing the first data vector to obtain the second data vector comprises:
   multiplying the matrix by the first data vector to obtain the second data vector.

9. The computer-implemented method of claim 4, wherein processing the first data vector to obtain the second data vector comprises:
   configuring the second data vector to include a portion of data from the first data vector and a plurality of zero values.

10. The computer-implemented method of claim 4, wherein:
   the first portion includes a first layer and a second layer;
   the processing of the text data to obtain the first data vector is performed by processing a first matrix representing the text data using a data structure included in the first layer; and
   the processing of the first data vector to obtain the second data vector is performed by processing the first data vector using a second matrix included in the second layer.

11. The computer-implemented method of claim 4, wherein the text data corresponds to a word string of an utterance, the word string including the first word, and the method further comprises:
   processing the word string to obtain a plurality of data vectors having the second dimensionality, the plurality of data vectors including the first data vector;
   determining a first matrix including the plurality of data vectors;
   processing the first matrix to obtain a second matrix, the second matrix including the second data vector; and
   using the second matrix as input to the plurality of layers.

12. The computer-implemented method of claim 4, further comprising, prior to receiving the text data:
   identifying a plurality of word embedding features corresponding to a word embedding format;
   determining a reduced number of features corresponding to a desired NLU function;
   identifying a first vocabulary data structure corresponding to the word embedding data format and corresponding to the first dimensionality;
   determining a transformation matrix to transfer data having the first dimensionality to data having the second dimensionality; and
   processing the first vocabulary data structure using the transformation matrix to determine a second vocabulary data structure for inclusion in the first portion, the second vocabulary data structure comprising at least the first data vector.

13. The computer-implemented method of claim 12, wherein determining the reduced number comprises performing a singular value decomposition operation using data corresponding to the desired NLU function and data corresponding to the plurality of word embedding features.

14. The computer-implemented method of claim 4, further comprising selecting, from a plurality of models corresponding to an NLU function, the model, wherein the plurality includes a second model including a different first portion and the second portion, the different first portion including a third data vector corresponding to the first word, the third data vector including word embedding data having a third dimensionality, the third dimensionality being smaller than the second dimensionality.

15. A system comprising:
   at least one processor; and
   at least one memory including instructions that, when executed by the at least one processor, cause the system to:
      receive text data corresponding to at least a first word;
      select a model for performing natural language understanding (NLU) processing, the model including a first portion and a second portion, the second portion including a plurality of layers wherein:
         an initial layer of the plurality of layers is configured to be used to operate on input word embedding data having a first dimensionality, and
         a final layer of the plurality of layers is configured to be used to output NLU data;
      process the text data using the first portion to obtain a first data vector corresponding to the first word, the first data vector including word embedding data having a second dimensionality, the second dimensionality being smaller than the first dimensionality;
      process the first data vector to obtain a second data vector corresponding to the first word, the second data vector having the first dimensionality;
      process the second data vector using the initial layer of the plurality of layers; and
      determine, as a result of an operation using the final layer of the plurality of layers, first output NLU data corresponding to at least the first word.

16. The system of claim 15, wherein the first portion comprises a vocabulary data structure representing a vocabulary of words corresponding to an NLU operation corresponding to the model, the data structure corresponding to the second dimensionality.

17. The system of claim 16, wherein the instructions that configure the system to process the text data using the first portion comprise instructions that, when executed by the at least one processor, cause the system to:
   multiply a matrix representing words of the text data by the data structure to obtain at least the first data vector.

18. The system of claim 15, wherein the text data corresponds to a word string of an utterance, the word string including the first word, and the system further comprises instructions that, when executed by the at least one processor, further cause the system to:
   process the word string to obtain a plurality of data vectors having the second dimensionality, the plurality of data vectors including the first data vector;
   determine a first matrix including the plurality of data vectors;
   process the first matrix to obtain a second matrix, the second matrix including the second data vector; and
   use the second matrix as input to the plurality of layers.

19. The system of claim 15, wherein:

the first portion includes a first layer and a second layer;

processing of the text data to obtain the first data vector is performed by processing a first matrix representing the text data using a data structure included in the first layer; and processing of the first data vector to obtain the second data vector is performed by processing the first data vector using a second matrix included in the second layer.

20. The system of claim 15, wherein the system further comprises instructions that, when executed by the at least one processor, further cause the system to, prior to receiving the text data:

identify a plurality of word embedding features corresponding to a word embedding format;

determine a reduced number of features corresponding to a desired NLU function;

identify a first vocabulary data structure corresponding to the word embedding data format and corresponding to the first dimensionality;

determine a transformation matrix to transfer data having the first dimensionality to data having the second dimensionality; and process the first vocabulary data structure using the transformation matrix to determine a second vocabulary data structure for inclusion in the first portion, the second vocabulary data structure comprising at least the first data vector.

21. The system of claim 20, wherein the instructions to determine the reduced number comprise instructions to perform a singular value decomposition operation using data corresponding to the desired NLU function and data corresponding to the plurality of word embedding features.

\* \* \* \* \*